United States Patent
Yasuda et al.

(10) Patent No.: US 10,888,047 B2
(45) Date of Patent: Jan. 12, 2021

(54) PARKING BRAKE APPARATUS FOR VEHICLE

(71) Applicant: Kanzaki Kokyukoki Mfg. Co., Ltd., Amagasaki (JP)

(72) Inventors: Toshifumi Yasuda, Amagasaki (JP); Jun Matsuura, Amagasaki (JP); Koji Iwaki, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 5 days.

(21) Appl. No.: 16/260,831

(22) Filed: Jan. 29, 2019

(65) Prior Publication Data

US 2019/0230863 A1  Aug. 1, 2019

(30) Foreign Application Priority Data

Feb. 1, 2018 (JP) .................................. 2018-16721

(51) Int. Cl.
| | | |
|---|---|---|
| *B60T 1/00* | (2006.01) | |
| *B60T 13/58* | (2006.01) | |
| *A01D 69/10* | (2006.01) | |
| *B60T 7/10* | (2006.01) | |
| *B60T 11/21* | (2006.01) | |

(52) U.S. Cl.
CPC .............. *A01D 69/10* (2013.01); *B60T 1/005* (2013.01); *B60T 7/104* (2013.01); *B60T 13/588* (2013.01); *B60T 11/21* (2013.01)

(58) Field of Classification Search
CPC ....... A01D 69/10; B60T 7/104; B60T 13/588; B60T 11/21
See application file for complete search history.

(56) References Cited

U.S. PATENT DOCUMENTS

| | | | | | |
|---|---|---|---|---|---|
| 1,795,299 | A | * | 3/1931 | Leon ....................... | B60T 11/10 188/152 |
| 4,088,209 | A | * | 5/1978 | Drone ...................... | B60T 7/02 180/6.2 |
| 5,251,968 | A | * | 10/1993 | Rath ....................... | B60T 7/107 188/349 |
| 6,434,917 | B1 | * | 8/2002 | Bartel .................... | A01D 34/64 180/286 |
| 7,686,108 | B2 | * | 3/2010 | Piontek .................. | A01D 34/64 180/6.2 |

(Continued)

*Primary Examiner* — Bradley T King
*Assistant Examiner* — James K Hsiao
(74) *Attorney, Agent, or Firm* — Sterne, Kessler, Goldstein & Fox P.L.L.C.

(57) ABSTRACT

Provided is a parking brake apparatus for a vehicle that allows an improvement in the ease of assembly. A parking brake apparatus includes a valve, a single hydraulic actuator that includes a cylinder, a piston housed in the cylinder in such a manner as to be reciprocably displaceable along the cylinder, and a principal brake rod connected to the piston, and can displace the piston to one of a brake operating position and a brake non-operating position by the valve, a balance arm connected to a first end portion of the principal brake rod on a side protruded from the cylinder, and a pair of left and right auxiliary brake rods provided between bent portions at end portions of the balance arm and left and right brake arms, respectively. The hydraulic actuator includes a spring member for constantly urging the piston to the brake operating position.

11 Claims, 16 Drawing Sheets

(56) References Cited

U.S. PATENT DOCUMENTS

| | | | |
|---|---|---|---|
| 7,954,907 B1* | 6/2011 | Wieber | A01D 69/10 188/106 P |
| 8,573,368 B2 | 11/2013 | Stover et al. | |
| 9,180,850 B2* | 11/2015 | Kuramoto | B60T 11/06 |
| 2004/0050026 A1* | 3/2004 | Stover | A01D 69/10 56/11.3 |
| 2006/0174601 A1* | 8/2006 | Piontek | A01D 34/64 56/11.3 |
| 2006/0225927 A1* | 10/2006 | Iwaki | B60K 17/105 180/6.3 |
| 2007/0012503 A1* | 1/2007 | Iida | B60K 17/105 180/305 |
| 2007/0125054 A1* | 6/2007 | Dong | B60T 7/12 56/11.3 |
| 2007/0151222 A1* | 7/2007 | Iida | A01D 69/06 56/157 |
| 2009/0260912 A1* | 10/2009 | Isogai | B60K 17/10 180/336 |
| 2009/0301076 A1* | 12/2009 | Yasuda | A01D 34/69 60/491 |
| 2012/0133200 A1* | 5/2012 | Oyama | B60T 13/12 303/10 |
| 2012/0241263 A1* | 9/2012 | Stover | A01D 69/10 188/156 |
| 2012/0313028 A1* | 12/2012 | Eberling | F16K 1/00 251/324 |
| 2013/0019709 A1* | 1/2013 | Jang | B60T 1/005 74/527 |
| 2013/0047568 A1* | 2/2013 | Yamada | A01D 69/10 56/14.7 |
| 2014/0223898 A1* | 8/2014 | Iida | A01D 34/69 60/491 |
| 2016/0281821 A1* | 9/2016 | Matsuura | F16D 48/02 |
| 2017/0086376 A1* | 3/2017 | Burns | A01D 34/64 |
| 2017/0247021 A1* | 8/2017 | Krystowski | A01D 34/006 |
| 2019/0270435 A1* | 9/2019 | Matsuura | B62D 11/04 |
| 2020/0000039 A1* | 1/2020 | Reese | A01D 69/10 |

* cited by examiner

PARKING BRAKE APPARATUS FOR VEHICLE

BACKGROUND OF THE INVENTION

(1) Field of the Invention

At least one embodiment of the present invention relates to a parking brake apparatus for a vehicle with transaxles.

(2) Description of Related Art

As disclosed in U.S. Pat. No. 8,573,368B, for example, there has been known a parking brake apparatus for a vehicle having a brake unit for restricting rotation of axles and brake arms of the brake unit, for operating the brake arms simultaneously to apply or release brakes for a pair of right and left transaxles.

The parking brake apparatus as described above includes an electric actuator having a pair of displacement portions for driving brake arms, individually. The displacement portions of the electric actuator and the pair of right and left brake arms are connected by a pair of right and left brake rods. The brake arms and the rods are connected via springs, constituting equalizers for actuating both right and left parking brakes equally with reliability.

Therefore, in the parking brake apparatus having the above configuration, it is necessary to connect the pair of right and left brake rods to the electric actuator, individually, and it takes time to assemble the parking brake apparatus. In addition, the electric actuator having the pair of displacement portions is a special order product and is expensive.

BRIEF SUMMARY

The present disclosure provides a parking brake apparatus for a vehicle that provides several advantages, including an improvement in the ease of assembly.

Specifically, embodiments of the parking brake apparatus including a braking unit and left and right brake arms of the braking unit, for operating the brake arms simultaneously to be in a brake operating state or a brake non-operating state, for a pair of left and right hydraulic transaxles, the parking brake apparatus using the hydraulic transaxles as a hydraulic pressure source, the parking brake apparatus including a solenoid valve for switching supply of hydraulic oil from the hydraulic transaxles, a single hydraulic actuator including a cylinder, a piston housed in the cylinder in such a manner as to be reciprocably displaceable along the cylinder, and a rod connected to the piston, the hydraulic actuator being capable of displacing the piston to one of a brake operating position and a brake non-operating position by the solenoid valve, a balance arm connected to an end portion of the rod on a side protruded from the cylinder, in such a manner as to be swingable with the end portion as a support point, and a pair of left and right brake rods provided between left and right end portions of the balance arm across the support point and the left and right brake arms, respectively, in which the hydraulic actuator further includes a spring member for constantly urging the piston to the brake operating position.

Other embodiments of the parking brake apparatus for a vehicle comprises brake units for right and left hydraulic transaxles, wherein each of the brake units comprise a brake arm and a single hydraulic actuator that includes a cylinder and a piston housed in the cylinder in such a manner as to be reciprocably displaceable along the cylinder. A valve for switching supply of hydraulic oil from the hydraulic transaxles to the single hydraulic actuator is provided, wherein the hydraulic actuator is configured to displace the piston to one of a brake operating position and a brake non-operating position in response to the switching of the hydraulic supply by the valve. A balance arm is connected to the piston in such a manner as to be at least partially free to rotate about a vertical axis of the vehicle. A pair of left and right brake rods are connected between left and right end portions of the balance arm and the left and right brake arms, respectively, In embodiments, the pair of left and right hydraulic transaxles includes a pair of left and right housings in which the hydraulic oil is stored, and a pair of left and right independent hydraulic continuously variable transmissions disposed in the housings, the left and right housings each have a discharge port for discharging the hydraulic oil from the housings, and a supply port for supplying the hydraulic oil to the housings, and the hydraulic oil is supplied to the hydraulic actuator from one oil passage of a pair of oil passages each connecting the discharge port of the housing on one side and the supply port of the housing on the other side to each other.

In embodiments, the vehicle has a seat on which a driver is seated, the hydraulic actuator is disposed below the seat with a displacement direction of the piston oriented in an up-down direction of a body of the vehicle, and the rod includes a first rod connected to the piston, being oriented in the up-down direction of the body of the vehicle, a second rod connected to the balance arm, being oriented in a front-back direction of the body of the vehicle, and a bell crank connecting the first rod and the second rod, for converting displacement of the first rod in the up-down direction into displacement in the front-back direction and transmitting the displacement to the second rod.

Advantages of embodiments of the parking brake apparatus for the vehicle include improvements to the ease of assembly.

DETAILED DESCRIPTION

Figure 1:
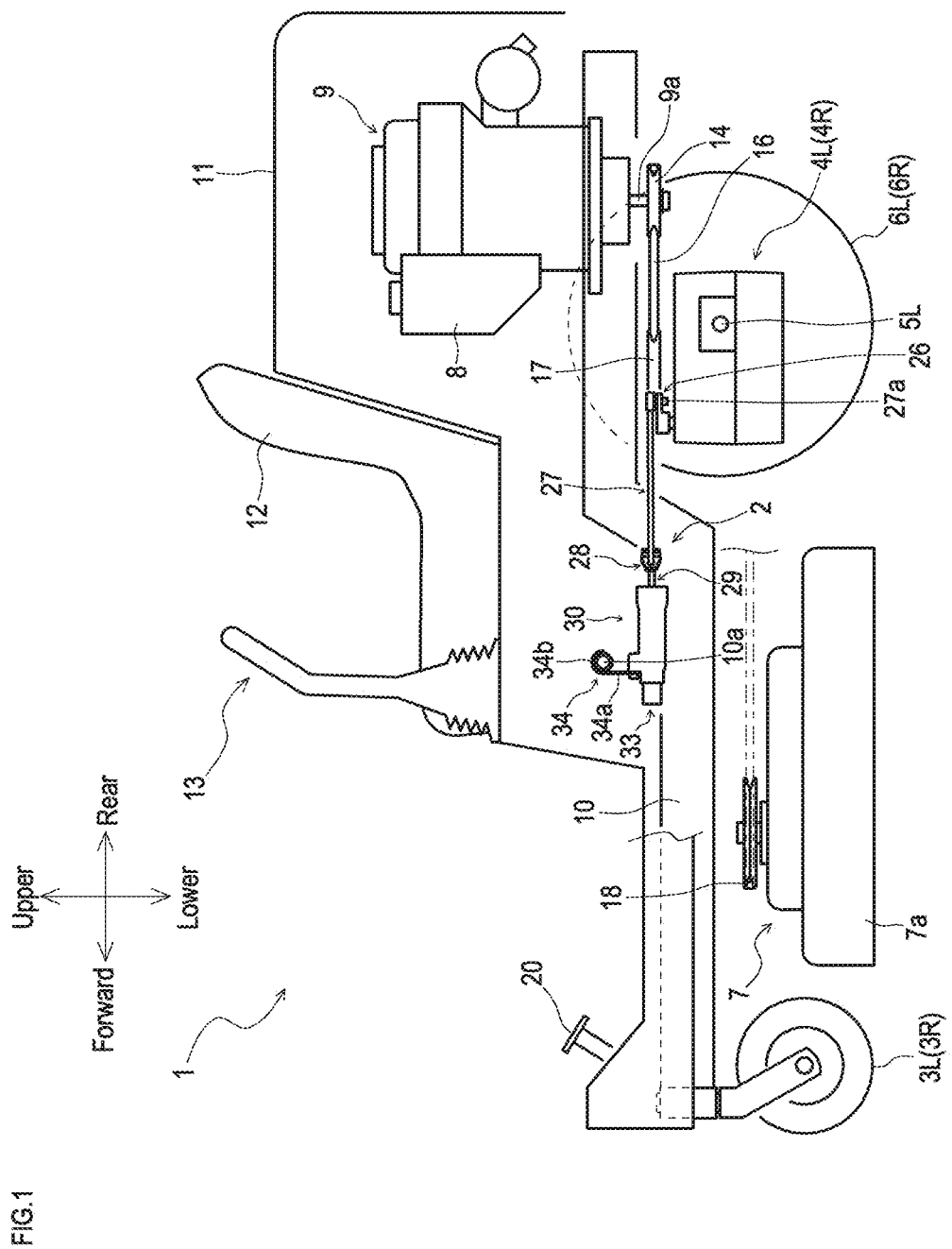
FIG. 1 is a partially cross-sectional side view showing the entire configuration of a work vehicle with a parking brake apparatus according to embodiments.
Figure 2:
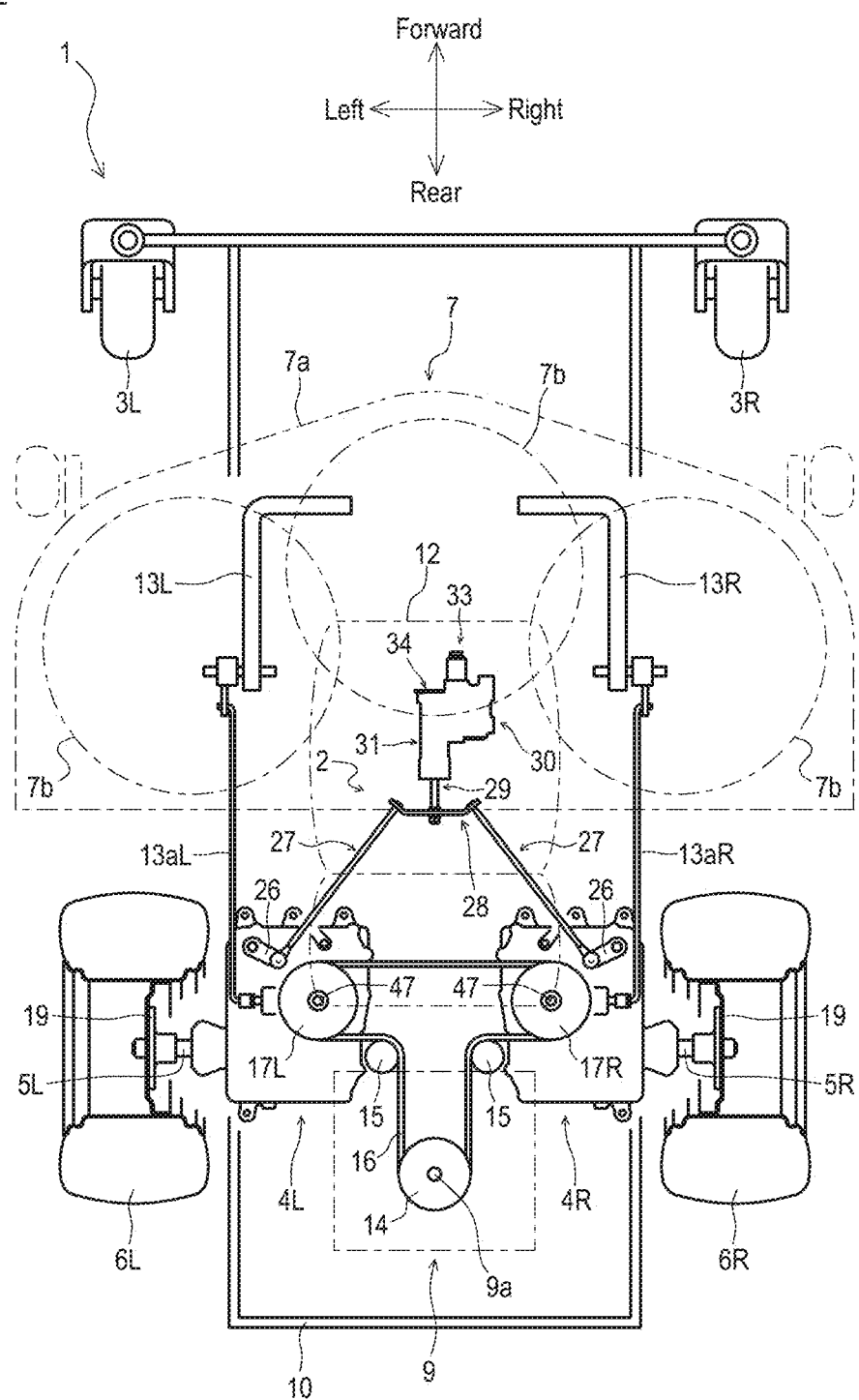
FIG. 2 is a plan view of the work vehicle with the parking brake apparatus according to embodiments.

A work vehicle 1 shown in FIGS. 1 and 2 is an example of a vehicle with a parking brake apparatus 2 according to a first embodiment. In the following description, as shown in FIGS. 1 and 2, the front-back direction, the up-down direction, and the left-right direction are defined for the work vehicle 1. In the other descriptions, the defined directions are used in common. A riding lawn mower illustrated as an example of the work vehicle 1 has a longitudinally elongated body frame 10 extended in the front-back direction. A pair of right and left casters 3R and 3L are disposed on the right and left of a front portion of the body frame 10. The work vehicle 1 also has a pair of right and left transaxles 4R and 4L disposed on the right and left of a rear portion of the body frame 10.

From the transaxles 4R and 4L, axles 5R and 5L are protruded outward, respectively. Rear wheels 6R and 6L are fixed on outer end portions of the axles 5R and 5L, respectively. A mower 7 is provided below the body frame 10 between the rear wheels 6R and 6L and the casters 3R and 3L. A prime mover 9 such as an internal combustion engine with a fuel tank 8 provided at the front is placed on the rear portion of the body frame 10. The body frame 10 and the prime mover 9 are covered with a cover 11. A driver's seat 12 is placed on the cover 11. A pair of right and left steering levers 13R and 13L are provided at a front portion of the driver's seat 12. A parking brake pedal 20 constituting an operating portion of the parking brake apparatus 2 is provided in front of the steering levers 13R and 13L. Instead of a pedal, the operating portion may be of a lever type. Alternatively, the parking brake apparatus 2 may be actuated by simultaneously operating the steering levers 13R and 13L from a neutral position to a parking position.

Here, the configuration of the parking brake apparatus 2 in a case where it is operated by the steering levers 13L and 13R will be described.

Figure 15A:
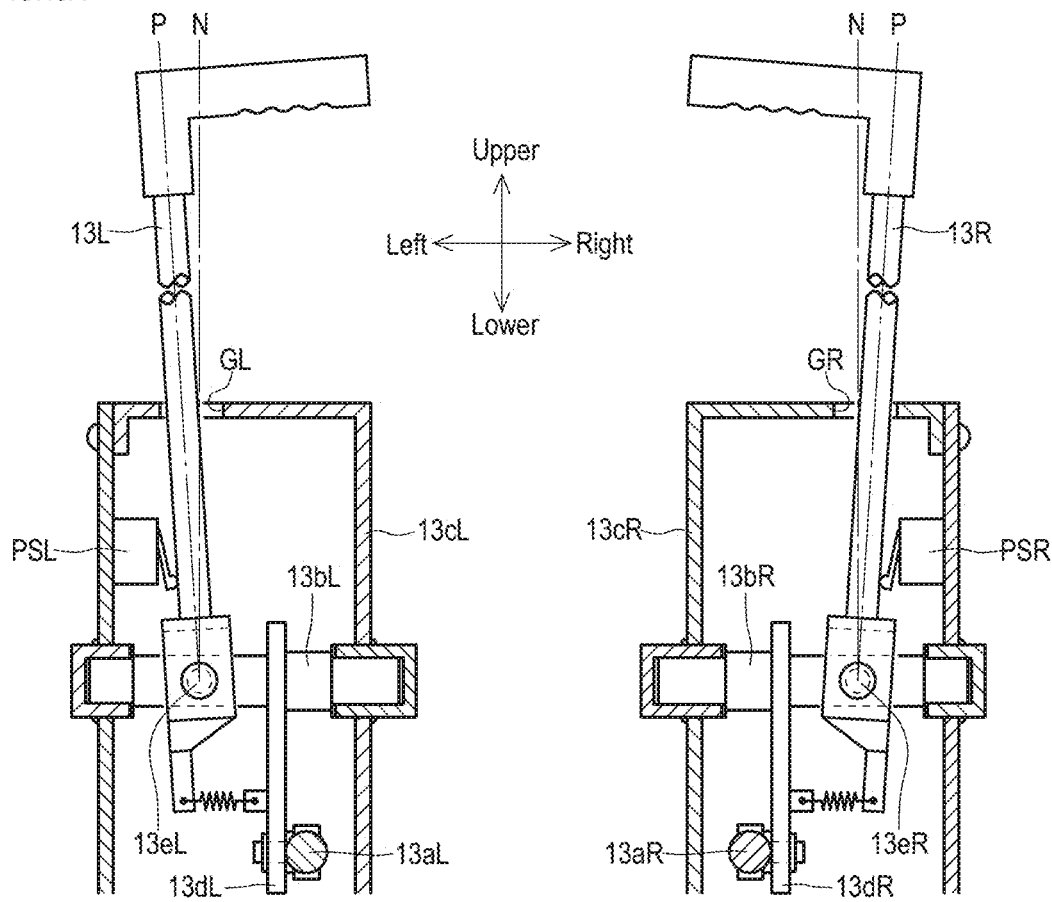
FIG. 15A is a partially cross-sectional rear view showing an apparatus configuration around steering levers when the parking brake apparatus is operated with the steering levers.
Figure 15B:
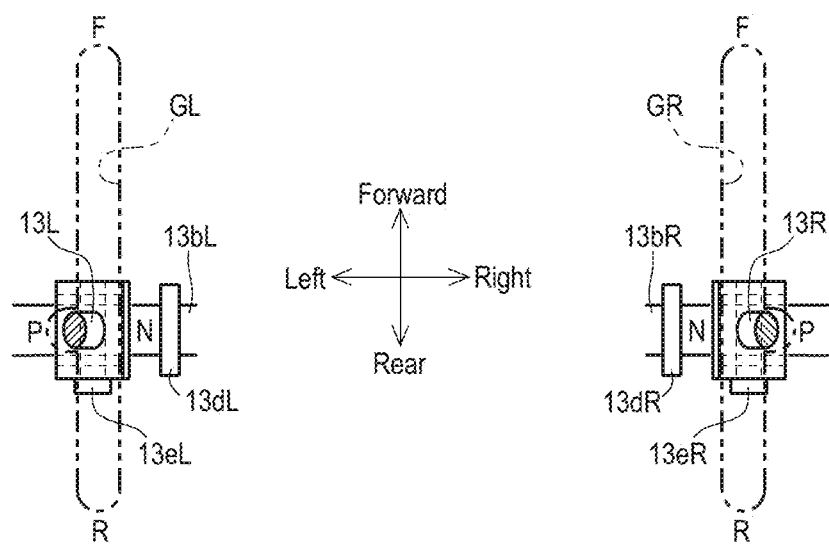
FIG. 15B is a partial schematic plan view showing the apparatus configuration around the steering levers when the parking brake apparatus is operated with the steering levers.

As shown in FIGS. 15A and 15B, the steering lever 13L in this case is configured to be rotatable in the front-back direction to a forward position (F) and a backward position (R) along a lever guide GL formed in a cover 13cL that supports a first rotating shaft 13bL of the steering lever 13L and covers the first rotating shaft 13bL. An arm 13dL is provided to the first rotating shaft 13bL, being protruded in a direction orthogonal to the axial direction. A first end of a rod 13aL is rotatably connected to the arm 13dL. A second end of the rod 13aL is connected to the transaxle 4L. An operation of rotating the steering lever 13L is transmitted to the transaxle 4L via the rod 13aL.

The steering lever 13L and the first rotating shaft 13bL are configured to be rotatable about a second rotating shaft 13eL that is a rotating shaft orthogonal to the first rotating shaft 13bL, via the second rotating shaft 13eL. The steering lever 13L is configured to be rotatable, in a neutral (N) position, in the left direction to a parking position (P) along the lever guide GL. A left switch PSL is disposed inside the cover 13cL. By rotating the steering lever 13L from the neutral (N) to the parking position (P), the left switch PSL is pressed by a left side portion of the steering lever 13L.

The steering lever 13R in this case is configured to be rotatable in the front-back direction to a forward position (F) and a backward position (R) along a lever guide GR formed in a cover 13cR that supports a first rotating shaft 13bR of the steering lever 13R and covers the first rotating shaft 13bR. An arm 13dR is provided to the first rotating shaft 13bR, being protruded in a direction orthogonal to the axial direction. A first end of a rod 13aR is rotatably connected to the arm 13dR. A second end of the rod 13aR is connected to the transaxle 4R. An operation of rotating the steering lever 13R is transmitted to the transaxle 4R via the rod 13aR.

The steering lever 13R and the first rotating shaft 13bR are configured to be rotatable about a second rotating shaft 13eR that is a rotating shaft orthogonal to the first rotating shaft 13bR, via the second rotating shaft 13eR. The steering lever 13R is configured to be rotatable, in a neutral (N) position, in the right direction to a parking position (P) along the lever guide GR. A right switch PSR is disposed inside the cover 13cR. By rotating the steering lever 13R from the neutral (N) to the parking position (P), the right switch PSR is pressed by a right side portion of the steering lever 13R.

Figure 16:
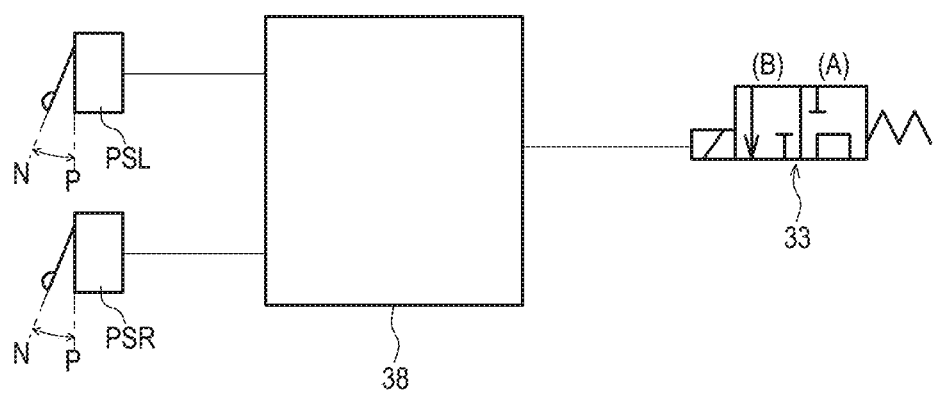
FIG. 16 is a block diagram showing the configuration of a control device when the parking brake apparatus is operated with the steering levers.

As shown in FIG. 16, the left and right switches PSL and PSR are electrically connected to a controller 38. When both the left and right switches PSL and PSR are "ON," for example, a valve (e.g. solenoid valve 33 described later) is switched to a "de-energized (A)" state by a command signal sent from the controller 38, or when both the left and right switches PSL and PSR are "OFF," the valve (e.g. solenoid valve 33 described later) is switched to an "energized (B)" state. In this manner, the parking brake apparatus 2 can be configured such that the driver performs an operation of opening the left and right steering levers 13L and 13R outward to the left and right, instead of stepping on the parking brake pedal 20, to operate the parking brake apparatus 2.

As shown in FIGS. 1 and 2, a power output shaft 9a is protruded vertically downward from the prime mover 9. An upper pulley 14 is fixed on the power output shaft 9a. The upper pulley 14 is connected to input pulleys 17R and 17L of the right and left transaxles 4R and 4L via a belt 16 stretched by tension pulleys 15. Power from the prime mover 9 is transmitted to the input pulleys 17R and 17L to drive the transaxles 4R and 4L. Note that, a lower pulley (not shown) is further fixed on the power output shaft 9a. Just in front of the lower pulley, a PTO clutch system of a hydraulic clutch type (not shown) suspended from and supported by the body frame 10 is disposed. A belt (not shown) wound around the lower pulley is tensioned by a tension pulley (not shown), and is connected to an input pulley (not shown) of the PTO clutch system. An output pulley (not shown) connected to the input pulley in such a manner as to be able to be disconnected via a PTO clutch is connected to an input pulley 18 of the mower 7 via a belt (not shown), so that the mower 7 is driven by power from the prime mover 9. A plurality of blades 7b are housed in a deck 7a of the mower 7. By rotating the blades 7b, an operation of mowing a lawn or the like can be performed.

Figure 3:
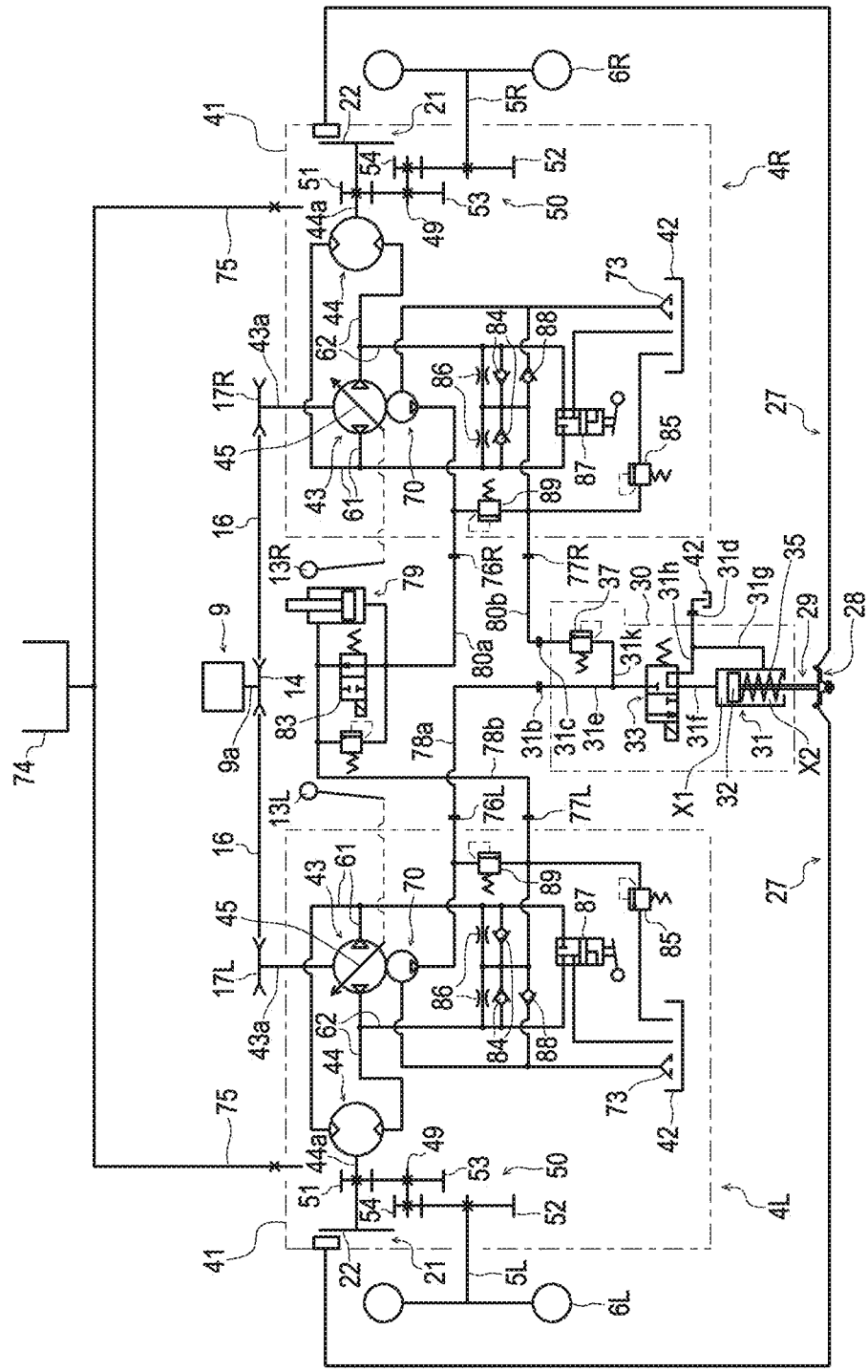
FIG. 3 is a hydraulic circuit diagram of the work vehicle with the parking brake apparatus according to embodiments.

Next, the transaxles 4R and 4L will be described. Note that since the right and left transaxles 4R and 4L are symmetrical to each other as shown in FIGS. 2 and 3, in the present embodiment, the right transaxle 4R will be mainly described, and for the left transaxle 4L, only differences will be described.

As shown in FIGS. 2 to 6, the transaxle 4R has a housing 41 including an upper housing half 41a and a lower housing half 41b. In the housing 41, a hydraulic pump 43 of a variable displacement type and an axial piston type, and a hydraulic motor 44 of the same axial piston type are installed. The right axle 5R is protruded rightward from the housing 41. A flange 19 connected to the rear wheel 6R is fixed on the outer end of the axle 5R. Note that the type of the pump and motor may alternatively be a radial piston type, for example.

The hydraulic pump 43 and the hydraulic motor 44 are installed in a center section 60 installed in the housing 41, and via a pair of oil passages 61 and 62 (closed circuit) provided inside the center section 60, the hydraulic pump 43 and the hydraulic motor 44 are fluidly connected to each other, thereby constituting a hydrostatic continuously variable transmission 40. The hydraulic pump 43 has a movable swash plate 45 as a volume control device. The tilt angle and tilt direction of the movable swash plate 45 are controlled to change the discharge rate and discharge direction of the hydraulic pump 43, thereby to set the rotation speed and rotation direction of the hydraulic motor 44 and the axle 5R. The hydraulic motor 44 has a fixed swash plate 46. The hydraulic pump 43 has a pump shaft 47 perpendicular to the axle 5R. The input pulley 17R is fixed on an upper portion of the pump shaft 47.

In housing the hydraulic pump 43 and the hydraulic motor 44 fluidly connected to each other in the common housing 41 in this manner, a horizontal upper surface of the center section 60 is used as a pump installation surface 60a, and the hydraulic pump 43 is installed on the pump installation surface 60a. The pump shaft 47 of the hydraulic pump 43 is protruded upward from an upper portion of the housing 41 in a direction at right angles to the axle 5R. To the pump shaft 47, rotational power from the power output shaft 9a is transmitted via the input pulley 17R.

Further, a vertical side surface of the center section 60 is used as a motor installation surface 60b, and the hydraulic motor 44 is installed on the motor installation surface 60b. In the housing 41, a motor shaft 48 of the hydraulic motor 44 and a countershaft 49 are provided in parallel to the axle 5R, and a reduction gear train 50 is installed from the motor shaft 48 to the axle 5R. In the reduction gear train 50, a motor output gear 51 is fixed on the motor shaft 48, a bull gear 52 is fixed on the axle 5R, a large-diameter gear 53 is provided on the countershaft 49 and engaged with the motor output gear 51, and a small-diameter final pinion 54 is provided on the countershaft 49 and engaged with the bull gear 52, so that variable-speed power from the hydraulic motor 44 is decelerated to be transmitted to the axle 5R.

The pair of steering levers 13R and 13L are connected to the movable swash plates 45 and 45 of the hydraulic pumps 43 and 43 in the transaxles 4R and 4L, respectively. By tilting the steering levers 13R and 13L in the same direction at the same angle, both of the hydraulic pumps 43 and 43 are changed in volume by the same amount, and the right and left hydraulic motors 44 and 44 that have received the discharged oil output the same number of revolutions, so that the body proceeds straight in the front-back direction. By tilting the steering levers 13R and 13L in different directions or at different angles, the volumes of the right and left hydraulic pumps 43 and 43 become different, and the right and left hydraulic motors 44 and 44 that have received the discharged oil output different numbers of revolutions, so that the right and left axles 5R and 5L have different numbers of revolutions, and the body changes the path in the right-left direction.

Here, the configuration of a hydraulic circuit of the transaxles 4L and 4R in the parking brake apparatus 2 will be described.

As shown in FIGS. 3 to 6, a charge pump 70, which is a trochoid pump including an inner gear 71 and an outer gear 72, is provided on a lower surface of the center section 60. From an oil sump 42 inside the housing 41, oil is sucked via an oil filter 73. Oil is supplied to and discharged from the oil sump 42 via an oil pipe 75 in accordance with the expansion and contraction of the volume of the oil in the oil sump 42 from and to an external reservoir tank 74 installed on the vehicle frame 10.

The housings 41 of the right and left transaxles 4R and 4L are provided with ports 76R, 76L, 77R, and 77L of an outwardly opening shape, which are connected to each other crosswise via oil passages 78a and 78b such as external piping, the port 76L to the port 77R, and the port 76R to the port 77L. The ports 76R and 76L are connected to the discharge side of the charge pumps 70. The ports 77R and 77L are connected to charge lines of the hydraulic continuously variable transmissions 40, and mutually supply charge oil to the transaxles 4R and 4L on the other side. Further, in the present embodiment, hydraulic oil can be supplied to external hydraulic equipment such as a lifting device 79 for the mower 7 on the route of the oil passage 78b. The cutting height of the mower 7 is adjusted by a switching valve 83 via the lifting device 79.

The hydraulic oil from the ports 77R and 77L is connected to the charge lines each including a pair of charge check valves 84 and 84 connected to the oil passages 61 and 62, individually, so that the hydraulic oil can be supplied to the low pressure side of the oil passages 61 and 62 via the charge check valves 84. Charge pressure adjustment valves 85 adjust the pressure of the hydraulic oil supplied from the ports 77R and 77L to the charge check valves 84.

Each of the charge check valves 84 is provided with an orifice 86. By discharging a small amount of the hydraulic oil from the oil passage 61 or the oil passage 62 on the high pressure side via the orifice 86, a neutral range of the continuously variable transmissions 40 is expanded. When the steering lever 13R reaches within certain play including a normal neutral position, the hydraulic pressure of the oil passage 61 or the oil passage 62 immediately becomes zero, and the hydraulic motor 44 and the axles 5R and 5L are stopped reliably.

Further, each continuously variable transmission 40 is provided with a bypass valve 87. The bypass valve 87 is usually closed. When the work vehicle 1 is towed, for example, the bypass valve 87 is forcibly opened to discharge the hydraulic oil from the closed circuit to the oil sump 42, to release the hydraulic motor 44 and the axle 5L from the hydraulic pressure of the continuously variable transmission 40 to make them rotatable.

In addition, each continuously variable transmission 40 is provided with a freewheel prevention valve 88. The freewheel prevention valve 88 is connected to an oil passage between the port 77 and the charge check valves 84. As a result, even if the hydraulic oil leaks from the closed circuit of the continuously variable transmission 40, the freewheel prevention valve 88 naturally opens due to negative pressure in the closed circuit, so that the hydraulic oil can be supplied from the oil sump 42 to the closed circuit.

An actuator relief valve 89 is provided to each continuously variable transmission 40. The actuator relief valve 89 is connected to an oil passage between the ports 76 and 77. Consequently, the supply pressure of the hydraulic oil from the transaxles 4L and 4R to be supplied to either a hydraulic actuator 30 or the lifting device 79 is adjusted.

Here, the parking brake apparatus 2 provided in the work vehicle 1 will be described.

As shown in FIGS. 1 to 9, the parking brake apparatus 2 includes the parking brake pedal 20, wet brake mechanisms 21, brake arms 26, auxiliary brake rods 27, an equalizer 28, a principal brake rod 29, and the hydraulic actuator 30.

As shown in FIG. 1, the parking brake pedal 20 is a part for the driver to artificially provide a parking instruction, and is provided pivotably in front of the driver's seat 12, protruding upward from the body frame 10. When the driver depresses the parking brake pedal 20 and holds it mechanically, the parking brake apparatus 2 is actuated. When the driver depresses the parking brake pedal 20 again to cancel the holding state, the parking brake apparatus 2 is released. A depressed position and a non-depressed position of the pedal are identified by a sensor not shown. When a signal of this identification and a signal of parking or non-parking from a different part match, a controller not shown drives an output portion of a hydraulic actuator described below to one of two positions (a brake operating position or a brake non-operating position).

Figure 4:
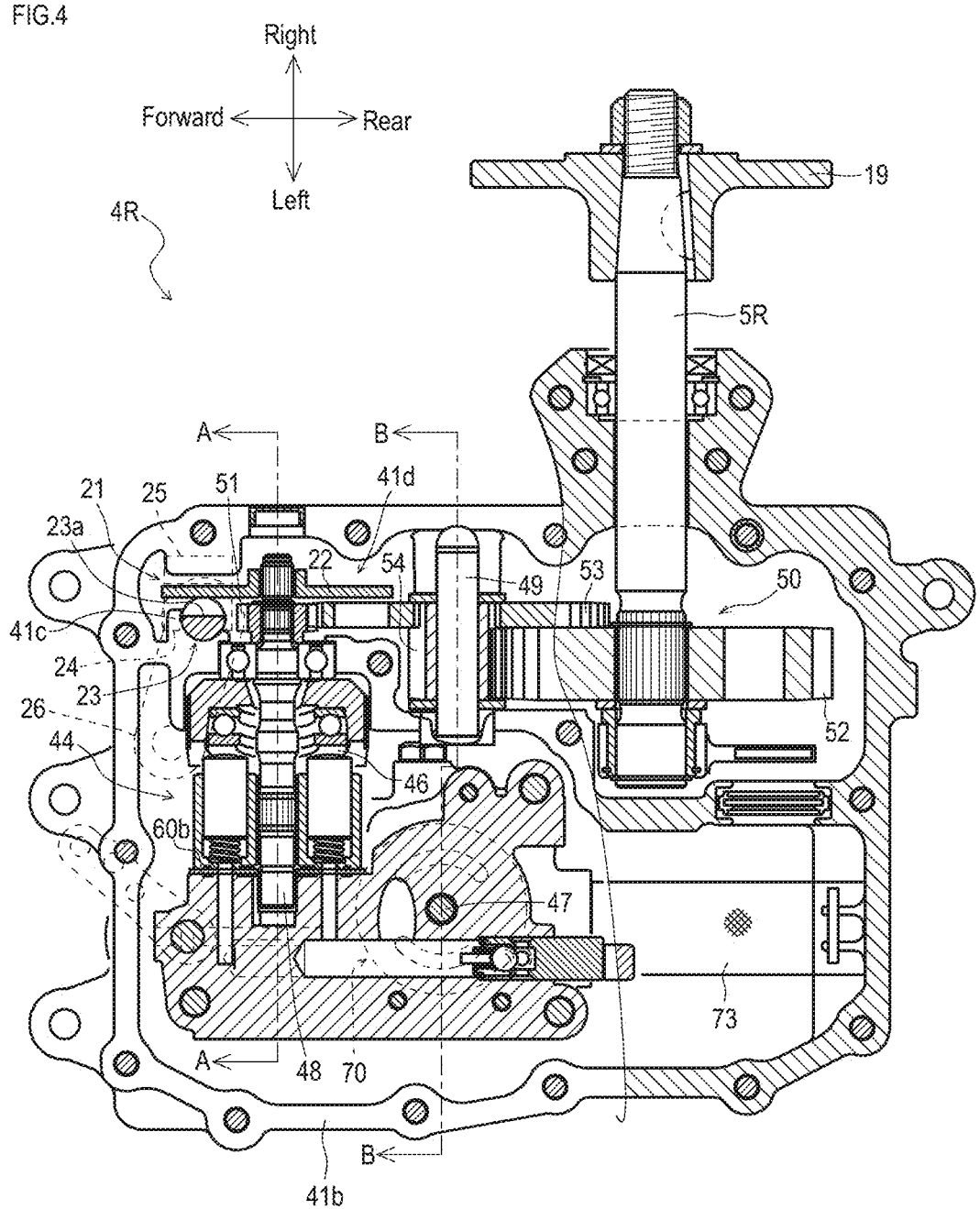
FIG. 4 is a cross-sectional plan view of a right transaxle.
Figure 5:
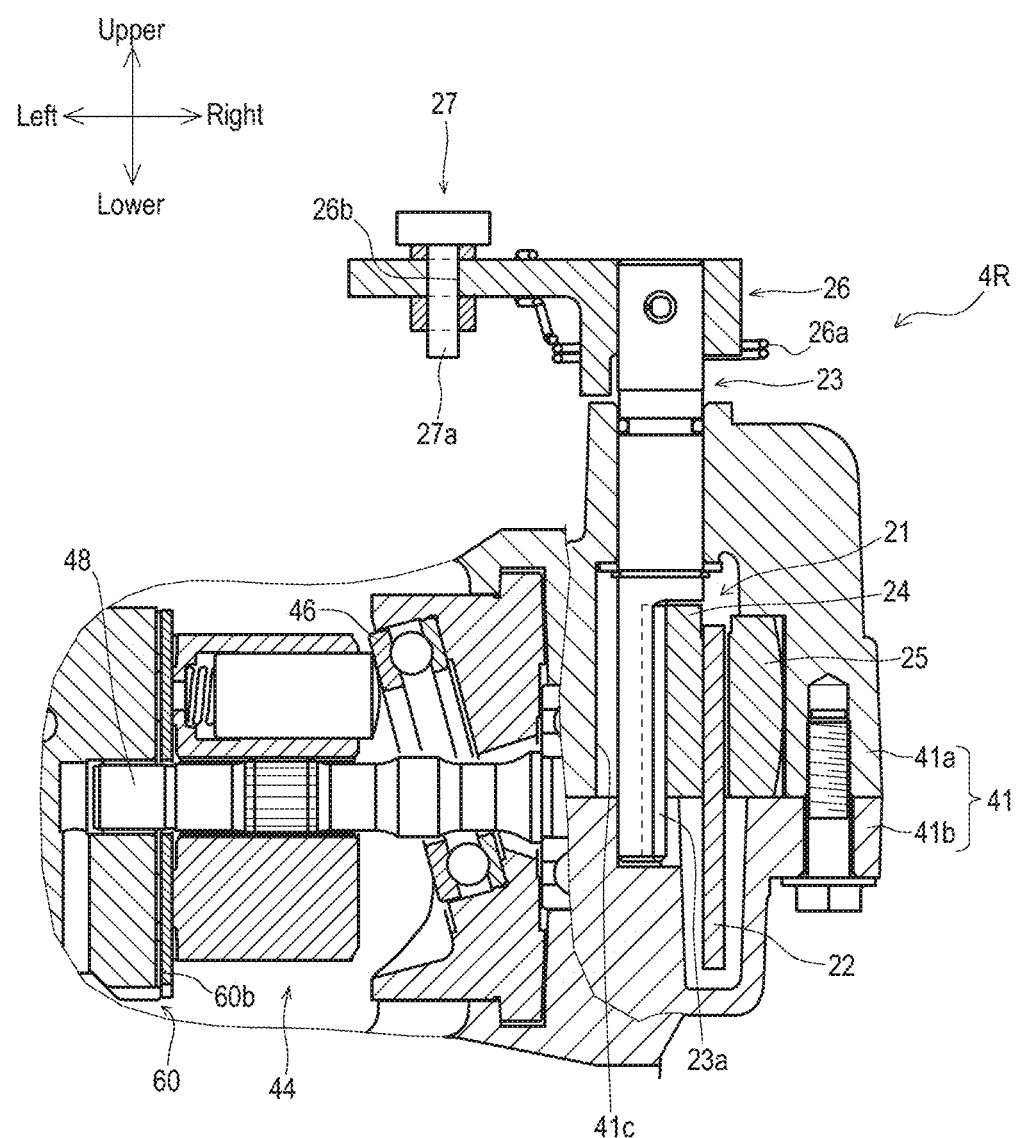
FIG. 5 is a cross-sectional view taken along line A-A in FIG. 4.
Figure 6:
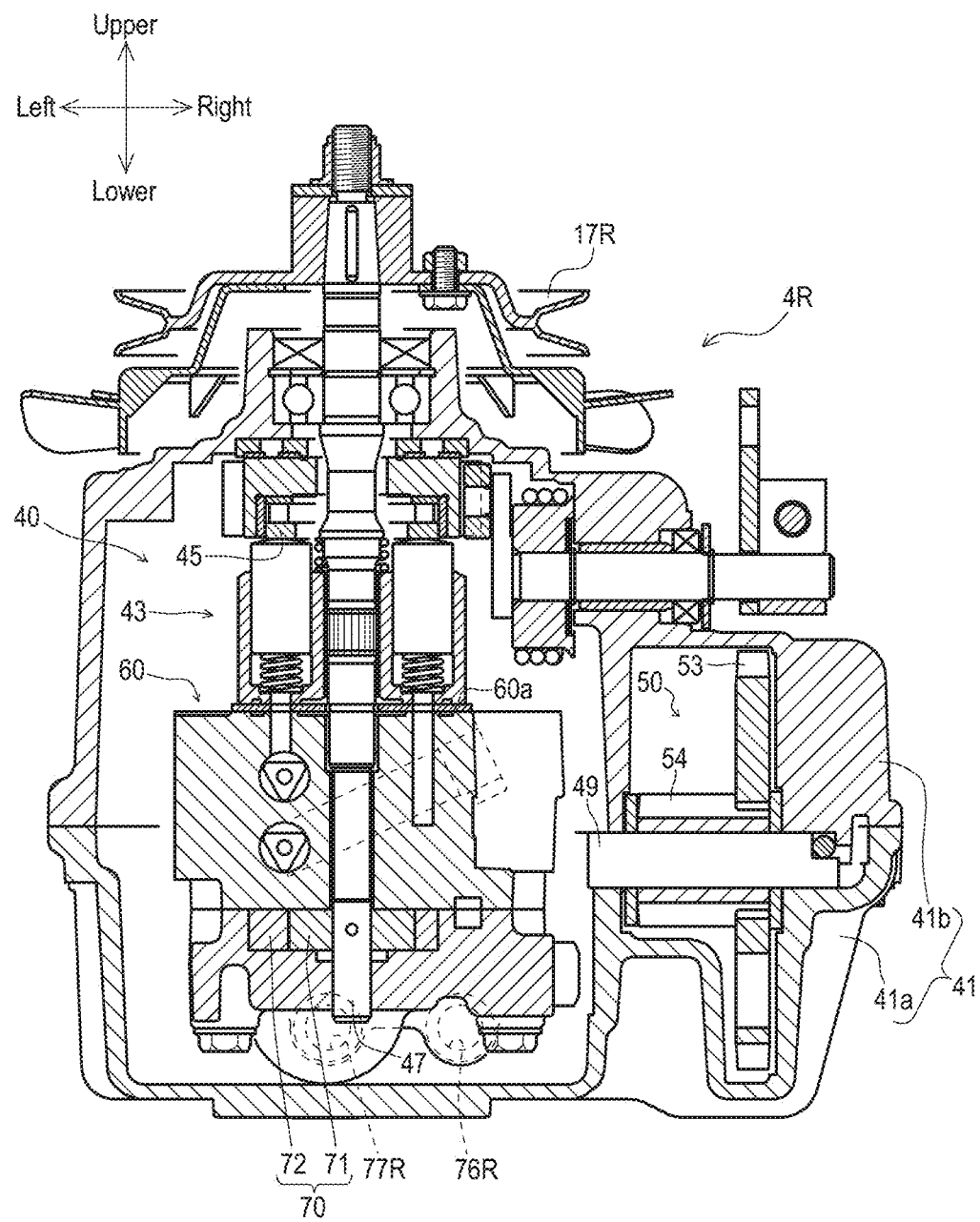
FIG. 6 is a cross-sectional view taken along line B-B in FIG. 4.

As shown in FIGS. 3 to 5, the wet brake mechanisms 21 are provided in the respective housings 41 of the transaxles 4L and 4R. A brake rotor 22 is fixed on a portion of the motor shaft 48 protruding from the motor output gear 51. A vertical brake camshaft 23 is provided between the brake rotor 22 and a partition wall 41c on the left side thereof, with a vertical middle portion rotatably supported in the upper housing half 41a. A lower portion of the brake camshaft 23 is formed as a semicircular cam portion in a cross-sectional plan view. During non-braking, a vertical flat face 23a thereof face the brake rotor 22 in parallel by an urging force of a return spring 26a.

A brake shoe 24 having a substantially U shape in a plan view is disposed between the vertical flat face 23a of the brake camshaft 23 and the brake rotor 22, surrounding the cam portion of the brake camshaft 23. A brake pad 25 is disposed between the brake rotor 22 and an outer wall of the upper housing half 41a on the right side of the brake rotor 22. The brake camshaft 23 is protruded upward from the upper housing half 41a, and the brake arm 26 is fixed on the protruding end thereof. The brake arm 26 is designed to be able to set a braking position and a non-braking position by its pivoting direction at a top surface of the upper housing half 41a.

Consequently, in the wet brake mechanism 21, when the brake arm 26 is set to the braking position, the vertical flat face 23a of the brake camshaft 23 becomes oblique in a plan view with respect to the brake rotor 22, one end of the vertical flat face 23a presses the brake shoe 24, the brake rotor 22 is sandwiched between the brake shoe 24 and the brake pad 25, and the motor shaft 48 is braked. When the brake arm 26 is set to the non-braking position, the vertical flat face 23a of the brake camshaft 23 becomes parallel to the brake shoe 24 and the brake rotor 22, the brake shoe 24 is separated from the brake rotor 22, and the motor shaft 48 becomes rotatable. The wet brake mechanisms constituting the parking brake apparatus 2 are not limited to a friction type in which a fixing pad is pressed against the surface of a brake pad as in the present embodiment, and, for example, may be of a lock type in which recessed portions are formed at equal intervals on the peripheral surface of a brake pad, and a fixing portion is fitted into the recessed portions.

As shown in FIGS. 1 and 2, first ends of the auxiliary brake rods 27 are connected to distal end portions of the brake arms 26. In the work vehicle 1, the first ends of the pair of right and left auxiliary brake rods 27 and 27 are connected to the brake arms 26 and 26 of the pair of right and left transaxles 4R and 4L, and second ends of the auxiliary brake rods 27 and 27 are connected to the common equalizer 28.

Figure 7:
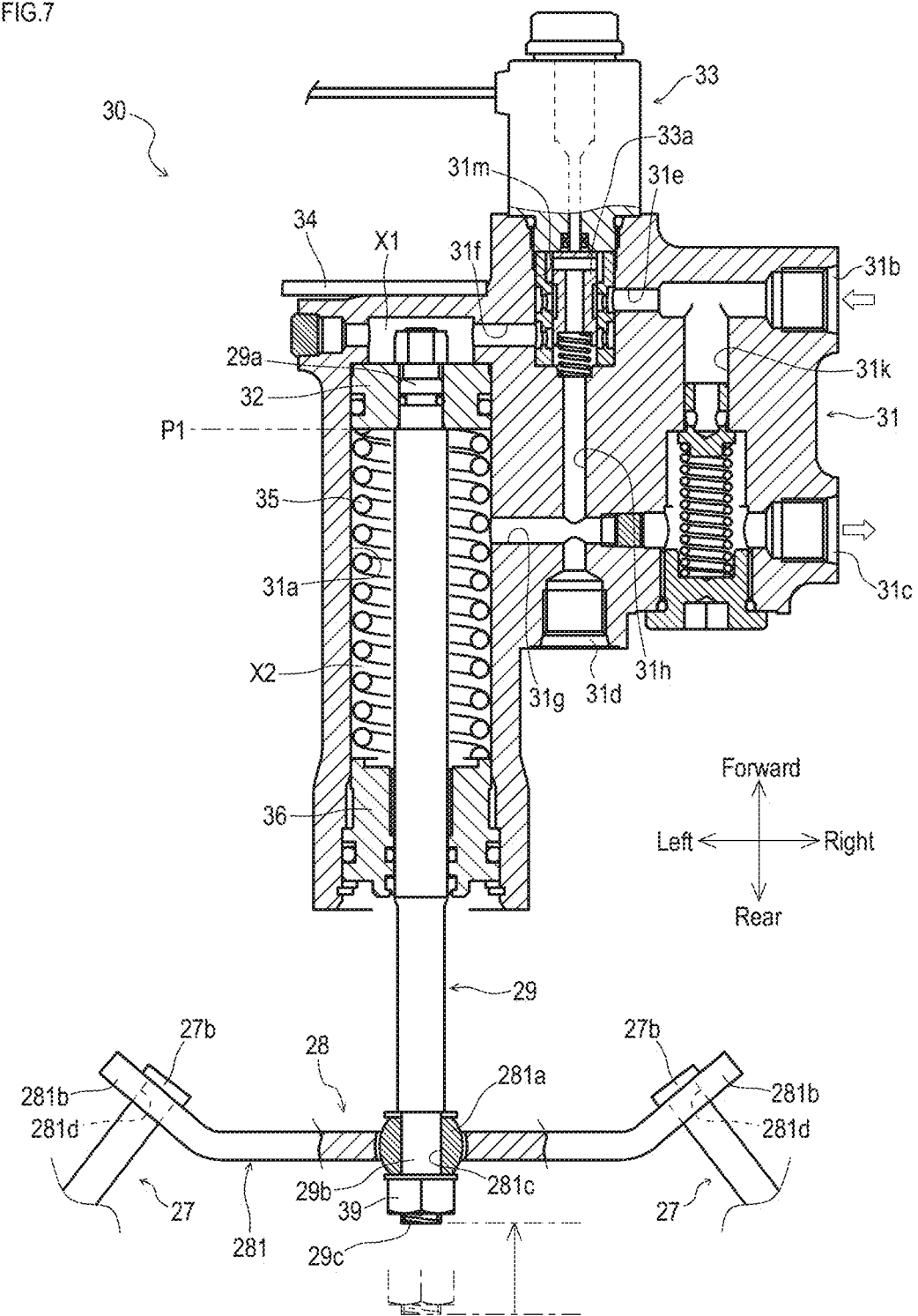
FIG. 7 is a partially enlarged cross-sectional plan view of the parking brake apparatus (in a brake operating state) according to embodiments.

Further, as shown in FIG. 7, a first end of the single principal brake rod 29 is connected to the equalizer 28. A second end of the principal brake rod 29 is connected to the single hydraulic actuator 30.

Here, the equalizer 28 will be described in detail.

Figure 9:
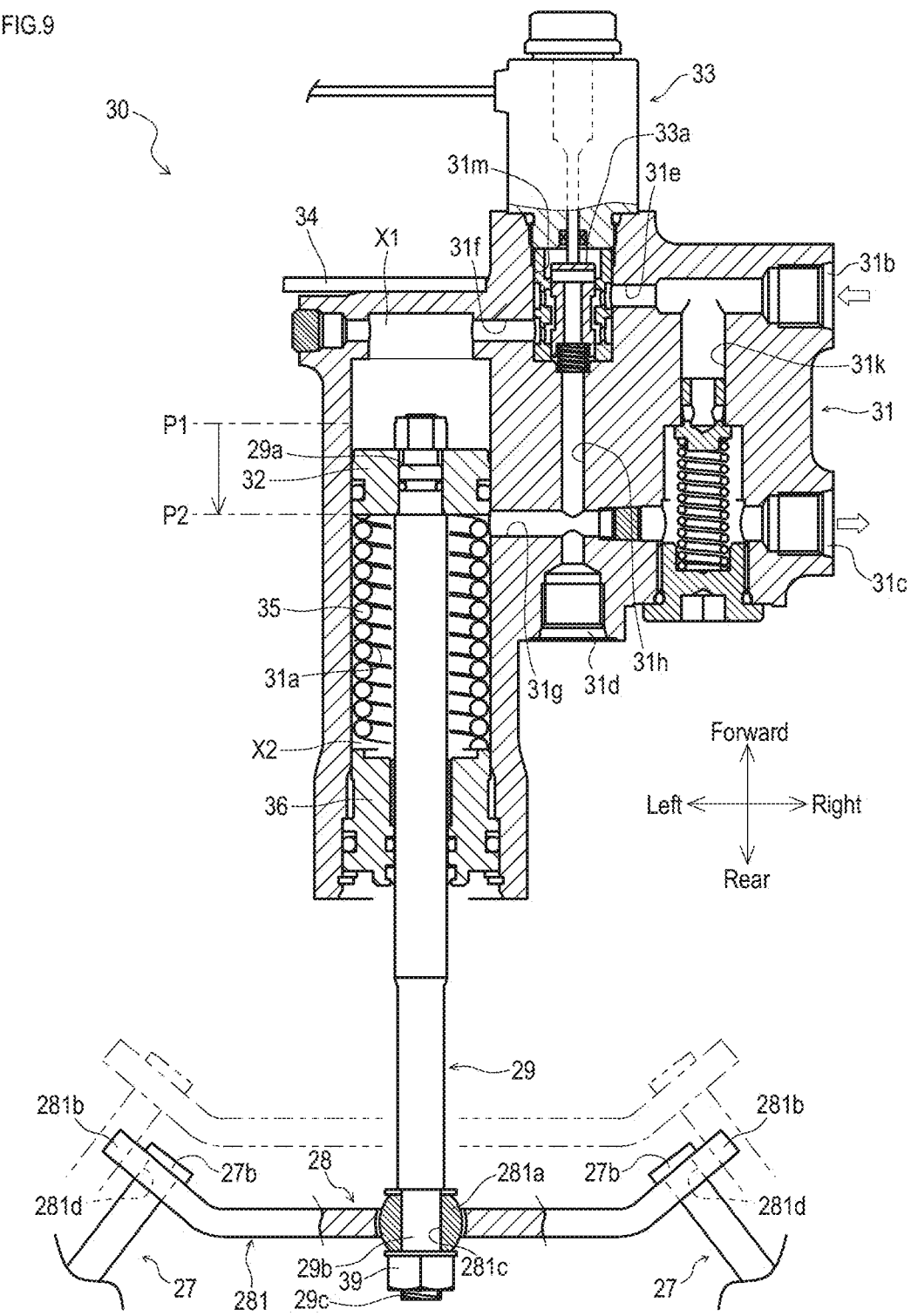
FIG. 9 is a partially enlarged cross-sectional plan view of the parking brake apparatus (in a brake non-operating state) according to embodiments.

As shown in FIGS. 7 and 9, the equalizer 28 is configured to operate the left and right brakes equally, and has the following configuration. Reference numeral 281 denotes a balance arm with both end portions of a rectangular flat plate bent into a substantially arcuate shape. The balance arm 281 has a ball joint 281a at the center in the length direction. The balance arm 281 also has bent portions 281b and 281b formed at both end portions in the length direction. The balance arm 281 also has a through hole 281c formed in the ball joint 281a, passing therethrough in the plate thickness direction of the balance arm 281, and through holes 281d formed near the centers of the bent portions 281b, passing therethrough in the plate thickness direction. The through hole 281c is a hole into which the principal brake rod 29 is inserted, and the through holes 281d are holes to which the auxiliary brake rods 27 are fixed.

At a first-side end portion of each auxiliary brake rod 27, an engaging portion 27a that is a rod-shaped part orthogonal to the axial direction of the auxiliary brake rod 27 is formed, and at a second-side end portion, an enlarged-diameter portion 27b with a diameter larger than the inner diameter of the through hole 28e is formed. Each auxiliary brake rod 27 is disposed by being inserted into the through hole 28e from the engaging portion 27a side, and further inserted to a position where the enlarged-diameter portion 27b abuts the bent portion 28c, and then engaging the engaging portion 27a with a hole 26b of the brake arm 26. Consequently, the brake arms 26 and the equalizer 28 are connected by the auxiliary brake rods 27.

As shown in FIG. 7, a threaded portion 29c is formed on a second end portion 29b of the principal brake rod 29. As shown in FIG. 9, the principal brake rod 29 is inserted into the through hole 281c of the equalizer 28 from the threaded portion 29c side, and a nut 39 is screwed to the threaded portion 29c. In this manner, the balance arm 281 is supported by the ball joint 281a swingably with respect to the principal brake rod 29.

In the parking brake apparatus 2, the principal brake rod 29 is directly connected to a piston 32.

Here, the hydraulic actuator 30 will be described. As shown in FIGS. 1 to 9, the hydraulic actuator 30 is a device serving as a drive source of the parking brake apparatus 2, and includes an actuator body 31, the piston 32, the solenoid valve 33, and a stay 34.

Figure 8:
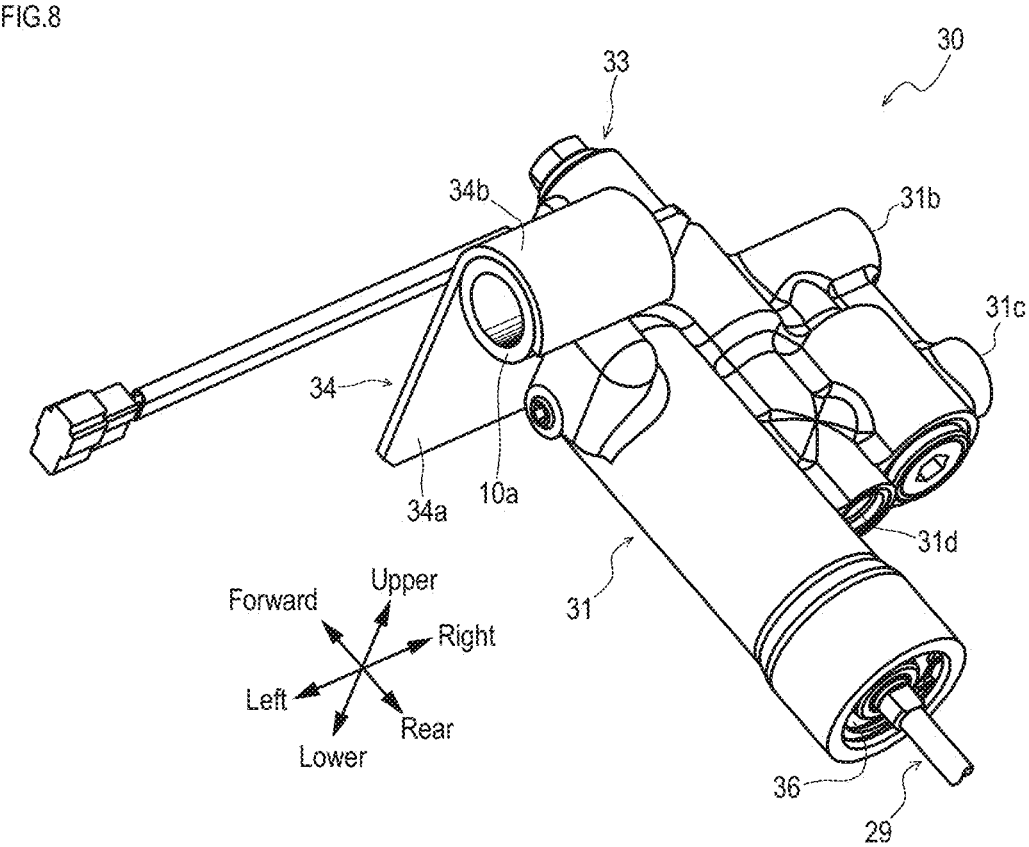
FIG. 8 is a partially enlarged perspective view of a portion of the parking brake apparatus according to embodiments.

As shown in FIG. 8, the hydraulic actuator 30 has the stay 34 attached to the actuator body 31. The stay 34 includes a base portion 34a extended in the up-down direction of the body of the work vehicle 1 and a semicircular hooking portion 34b continuous with the base portion 34a and constituting a portion protruding in the upward direction of the vehicle body. The hydraulic actuator 30 is disposed in a position to orient the principal brake rod 29 in the front-back direction of the vehicle body by hooking the hooking portion 34b on a pin 10a provided to the body frame 10, extended in the left-right direction of the vehicle body.

As shown in FIG. 3 and FIGS. 7 to 9, the hydraulic actuator 30 has a cylinder 31a that is a substantially cylindrical hollow portion formed in the actuator body 31. The piston 32 and a spring member 35 are built in the cylinder 31a. The piston 32 is constituted by a substantially cylindrical member, and is displaceable in the direction of the cylindrical axis of the cylinder 31a inside the cylinder 31a. A first end portion 29a of the principal brake rod 29 as an output portion of the hydraulic actuator 30 in the cylinder 31a is coaxially fixed on the cylindrical axis of the piston 32. The second end portion 29b of the principal brake rod 29 is extended to the outside from a rear-end opening of the cylinder 31a. A gap between the cylinder 31a and the principal brake rod 29 is sealed by a sealing member 36 fitted into the cylinder 31a from the rear-end opening. In the hydraulic actuator 30 with the piston 32 displaceably inserted into the cylinder 31a, a first oil chamber X1 is formed by an upper-side end portion of the piston 32 and the cylinder 31a, and a second oil chamber X2 is formed by a lower-side end portion of the piston 32, the cylinder 31a, and the sealing member 36.

In the actuator body 31, an IN port 31b, an OUT port 31c, a drain port 31d, oil passages 31e, 31f, 31g, 31h, and 31k, and a mounting hole 31m are formed.

The IN port 31b is a port for supplying the hydraulic oil from the transaxle 4L, and is connected to the port 76L of the left transaxle 4L via the oil passage 78a.

The OUT port 31c is a port for returning the hydraulic oil to the transaxle 4R, and is connected to the port 77R of the right transaxle 4R via the oil passage 80b.

The drain port 31d is a port for discharging the hydraulic oil from the cylinder 31a, and is connected to the oil sumps 42 in the housings 41.

The oil passages 31e and 31f connect the IN port 31b and the first oil chamber X1. The mounting hole 31m for the solenoid valve 33 is disposed between the oil passage 31e and the oil passage 31f. With this configuration, supply and stop of the hydraulic oil from the oil passage 31e to the oil passage 31f can be switched by switching the solenoid valve 33.

The oil passage 31g connects the drain port 31d and the second oil chamber X2. The oil passage 31g and the mounting hole 31m are connected by the oil passage 31h. With this configuration, the first oil chamber X1 and the second oil chamber X2 can be connected by switching the solenoid valve 33 (at the time of de-energization).

The oil passage 31k connects the OUT port 31c and the oil passage 31e. A relief valve 37 is disposed in the oil passage 31k. With this configuration, when the hydraulic oil is under high pressure in the oil passage 31e, the hydraulic oil supplied to the IN port 31b is returned to the OUT port 31c by releasing the relief valve 37.

The solenoid valve 33 is screwed into the mounting hole 31m formed in the actuator body 31. A valve element 33a is disposed in the mounting hole 31m.

Here, the operation of the hydraulic actuator 30 will be described.

As shown in FIG. 3 and FIGS. 7 to 9, at the time of travel, for example, the hydraulic actuator 30 energizes the solenoid valve 33, supplying the hydraulic oil supplied from the IN port 31b to the first oil chamber X1 via the valve element 33a and the oil passages 31e and 31f while discharging the hydraulic oil filling the second oil chamber X2 from the drain port 31d via the oil passage 31g, thereby disposing the piston 32 in a brake non-operating position P2 to extend the principal brake rod 29.

On the other hand, at the time of parking, the hydraulic actuator 30 de-energizes the solenoid valve 33, returning the hydraulic oil supplied from the IN port 31b to the OUT port 31c via the valve element 33a, the oil passage 31k, and the relief valve 37, discharging the hydraulic oil filling the first oil chamber X1 from the drain port 31d via the oil passages 31f and 31h, thereby disposing the piston 32 in a brake operating position P1 to shorten the principal brake rod 29.

At the time of parking, the piston 32 is urged by the spring member 35 as an urging member, and is displaced to the brake operating position P1 at the instant when the pressure of the hydraulic oil disappears. In this manner, the parking brake apparatus 2 switches the solenoid valve 33 to dispose the piston 32 in the brake non-operating position P2 during travel, and to dispose the piston 32 in the brake operating position P1 during parking.

Next, the operation of the parking brake apparatus 2 will be described. FIG. 7 shows a state where the hydraulic actuator 30 operates the brakes, and FIG. 9 shows a state where the hydraulic actuator 30 does not operate the brakes.

In the parking brake apparatus 2 in the brake non-operating state, when the driver performs an operation of depressing the parking brake pedal 20 (that is, artificially provides a parking instruction), as shown in FIG. 7, the solenoid valve 33 of the hydraulic actuator 30 is de-energized, and the piston 32 (the principal brake rod 29) is displaced to the brake operating position P1.

In the parking brake apparatus 2 in the brake operating state, when the driver performs an operation of depressing the parking brake pedal 20 (that is, artificially releases the parking instruction), as shown in FIG. 9, the solenoid valve 33 of the hydraulic actuator 30 is energized, and the piston 32 (principal brake rod 29) is displaced to the brake non-operating position P2.

The parking brake apparatus 2 thus configured has a configuration in which the equalizer 28 connects the auxiliary brake rods 27 and 27 and the principal brake rod 29. It is only necessary to fit the auxiliary brake rods 27 and 27 to the brake arms 26 and 26 of the transaxles 4R and 4L, so that the ease of assembly can be improved. In addition, the equalizer 28 allows the right and left auxiliary brake rods 27 and 27 to be displaced reliably to be in a brake working state, and allows the right and left wet brake mechanisms 21 to be actuated reliably and smoothly.

Further, the parking brake apparatus 2 using the hydraulic actuator 30 does not need to use a reduction gear train for decelerating the rotational power of a motor, unlike the case of using an electric actuator, and thus can be simplified in configuration compared with the case of using an electric actuator.

Figure 10:
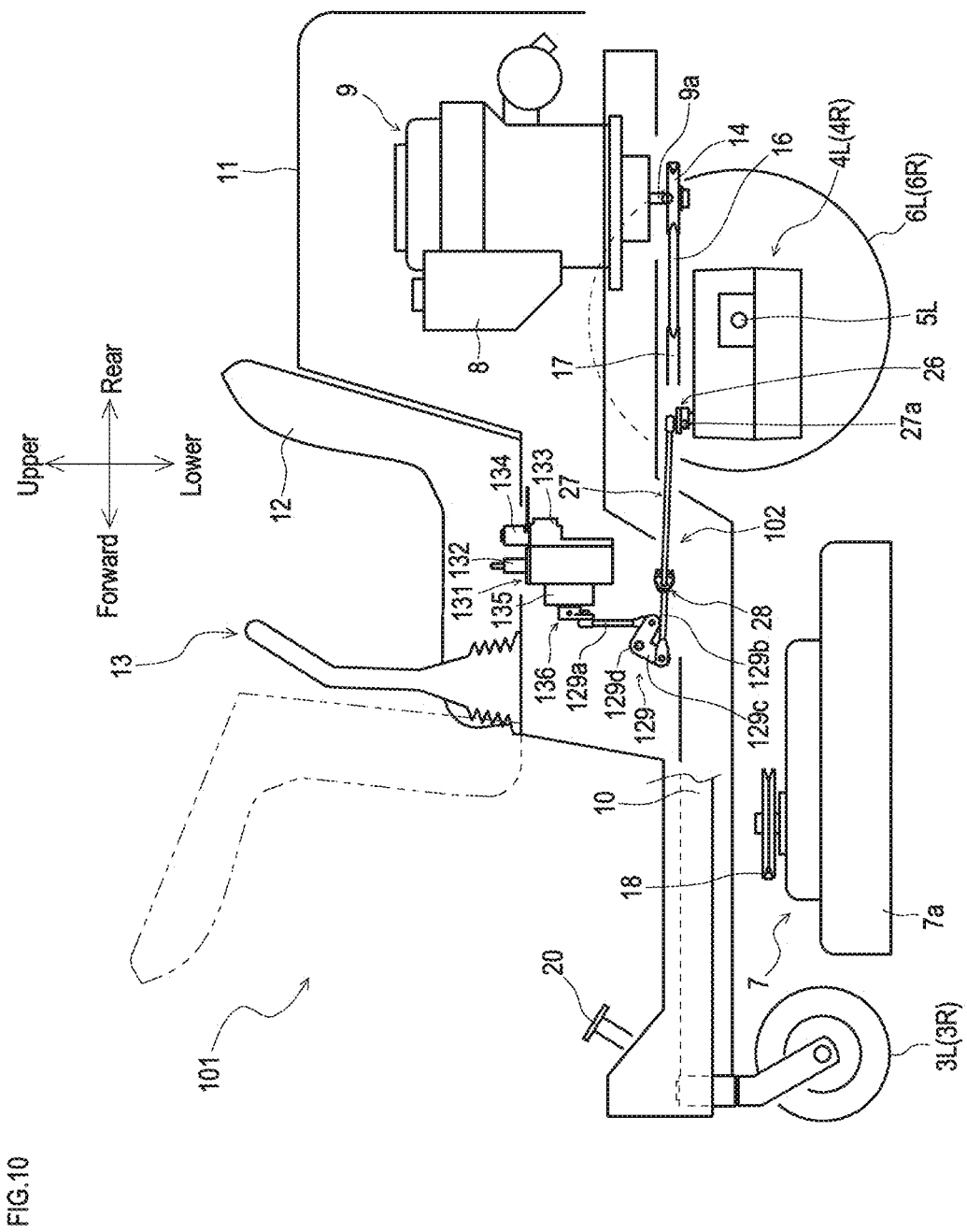
FIG. 10 is a partially cross-sectional side view showing the entire configuration of a work vehicle with a parking brake apparatus according to embodiments.
Figure 11:
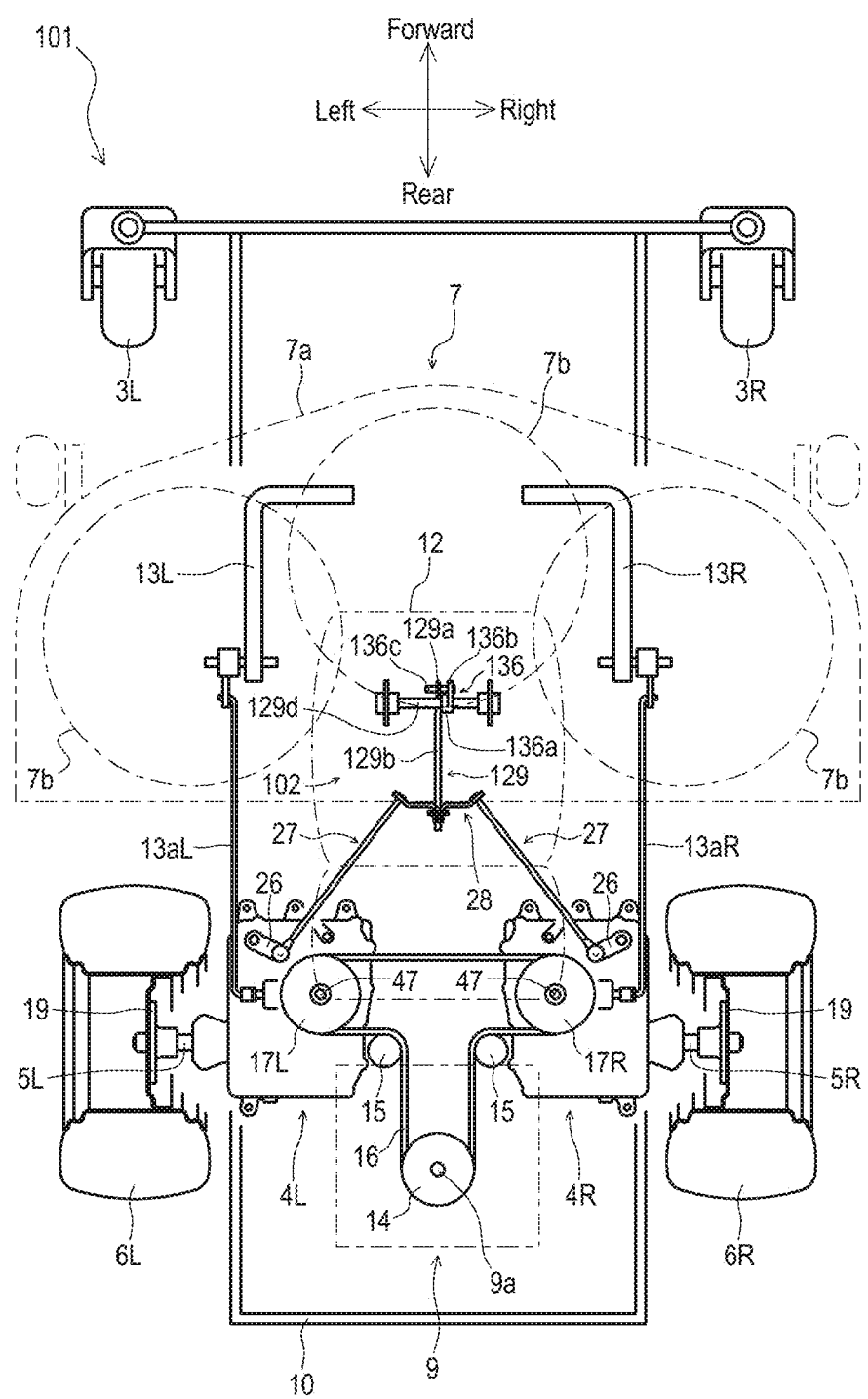
FIG. 11 is a plan view of the work vehicle with the parking brake apparatus according to embodiments.

Next, a work vehicle 101 with a parking brake apparatus according to a second embodiment will be described. The work vehicle 101 shown in FIGS. 10 and 11 includes a parking brake apparatus 102 according to the second embodiment. Note that the configuration of the work vehicle 101 other than the parking brake apparatus 102 is identical to the configuration of the work vehicle 1.

The parking brake apparatus 102 includes a parking brake pedal 20, wet brake mechanisms 21, brake arms 26, auxiliary brake rods 27, an equalizer 28, a principal brake rod 129, and a hydraulic actuator 131. The parking brake apparatus 102 is identical to the above-described parking brake apparatus 2 in configuration other than the principal brake rod 129 and the hydraulic actuator 131.

As shown in FIGS. 10 to 14, the principal brake rod 129 includes a first principal brake rod 129a, a second principal brake rod 129b, a bell crank 129c, and a bell crankshaft 129d.

The first principal brake rod 129a is disposed vertically with a first end connected to a displacement portion 136 of the hydraulic actuator 131, and a second end connected to the bell crank 129c relatively rotatably. The second principal brake rod 129b is disposed horizontally with a first end connected to the equalizer 28, and a second end connected to the bell crank 129c relatively rotatably. The bell crank 129c is swingably supported about the bell crankshaft 129d that is axially supported horizontally with respect to the right-left direction of the work vehicle 1. The bell crank 129c has a substantially L-shaped form, and is swingably supported in a position with a first side facing in the forward direction of the work vehicle 1 and a second side facing in the downward direction of the work vehicle 1, by the bell crankshaft 129d in the vicinity of a contact point of the two sides.

The hydraulic actuator 131 is a device serving as a drive source of the parking brake apparatus 102, and is disposed in a position closer to a driver's seat 12 above than the hydraulic actuator 30 described in the first embodiment. By tilting the driver's seat 12 as shown by a chain line and providing an opening (not shown) on the seat installation side, the hydraulic actuator 131 can be easily accessed. Also, during travel, the hydraulic actuator 131 can be protected from splashes of muddy water.

The hydraulic actuator 131 is a device serving as a drive source of the parking brake apparatus 102, and includes a release rod 132, a manifold 133, a solenoid valve 134, a transmission portion 135, and a displacement portion 136.

The hydraulic actuator 131 includes a cylinder 131a, a piston 131b, and a spring member 131c. A sliding member 131e is fitted in a groove 131d formed in the piston 131b, and a pin 131f is provided to the sliding member 131e. The groove 131d is formed in a direction orthogonal to the axial direction of the piston 131b as viewed from a direction orthogonal to the bottom of the groove 131d. The sliding member 131e is slidable along the groove 131d. The pin 131f protrudes from a window 131g formed in the cylinder 131a to the outside of the cylinder 131a. In the hydraulic actuator 131 with the piston 131b slidably inserted into the cylinder 131a, a first oil chamber X1 is formed between an upper-side end portion of the piston 131b and the cylinder 131a, and a second oil chamber X2 is formed between a lower-side end portion of the piston 131b and the cylinder 131a. On an upper-side end portion of the cylinder 131a, the release rod 132 is disposed.

The spring member 131c is disposed between a lower surface of the piston 131b and a bottom surface of the cylinder 131a in a state of being compressed from a steady length, and imparts an urging force in the upward direction (toward a brake operating position) constantly to the piston 131b. When the piston 131b is located in the highest region, a shaft hole 136c of the displacement portion 136 is located in the lowest region.

The release rod 132 is a part that is pushed down when the parking brake apparatus 102 is released, and includes a piston-shaped rod member 132a and a cylindrical case 132b. The release rod 132 is disposed so as to close the upper end of the cylinder 131a of the hydraulic actuator 131. By pushing down the rod member 132a that is vertically displaceable inside the case 132b, the piston 131b can be pressed downward by the rod member 132a.

The manifold 133 is a member for mounting the solenoid valve 134. In the manifold 133, a mounting hole 133a for mounting the solenoid valve 134, an IN port 133b, a drain port 133c, and oil passages 133d and 133e are formed. The oil passage 133d of the manifold 133 communicates with the first oil chamber X1 via an oil passage 131h formed in the cylinder 131a. The oil passage 133e communicates with the second oil chamber X2 via an oil passage 131k formed in the cylinder 131a.

The solenoid valve 134 is disposed in the manifold 133 by fitting a valve element 134a into the mounting hole 133a. At the time of travel, for example, the solenoid valve 134 is switched to a first position, supplying the hydraulic oil supplied from the IN port 133b to the first oil chamber X1 via the valve element 134a and the oil passages 133d and 131h, while the rod member 132a of the release rod 132 is pushed down, discharging the hydraulic oil filling the second oil chamber X2 from the drain port 133c via the oil passages 131k and 133e and the valve element 134a, thereby lowering the piston 131b. At the time of parking, the solenoid valve 134 is switched to a second position, supplying pressure oil supplied from the IN port 133b to the second oil chamber X2 via the valve element 134a and the oil passages 133e and 131k while discharging the hydraulic oil filling the first oil chamber X1 from the drain port 133c via the oil passages 131h and 133d and the valve element 134a, thereby raising the piston 131b. The rising movement of the piston 131b at this time is urged by the spring member 131c. By switching the solenoid valve 134 in this manner, at the time of travel, the pin 131f is disposed in a position in which it is lowered most, and at the time of parking, the pin 131f is disposed in a position in which it is raised most.

The transmission portion 135 includes an output shaft 135a, an arm member 135b, and a case 135c. The output shaft 135a is rotatably supported with respect to the case 135c. The arm member 135b is fixed on the output shaft 135a and extended in a direction orthogonal to the axial direction of the output shaft 135a. An engaging hole 135d engaged with the pin 131f is formed in a distal end portion of the arm member 135b. The case 135c closes the window 131g formed in the cylinder 131a to maintain oil tightness. In accordance with the displacement of the pin 131f in the upward direction, the arm member 135b is rotated clockwise in FIG. 13 with the output shaft 135a as an axis, whereby the output shaft 135a is rotated clockwise. Further, in accordance with the displacement of the pin 131f in the downward direction, the arm member 135b is rotated counterclockwise in FIG. 13 with the output shaft 135a as an axis, whereby the output shaft 135a is rotated counterclockwise. Note that when the arm member 135b rotates, the pin 131f and the sliding member 131e are displaced along the groove 131d. Thus, the pin 131f is displaced substantially in the up-down direction, drawing an arc-shaped locus. That is, the transmission portion 135 is a mechanism that converts a linear motion of the piston 131b and the pin 131f in the up-down direction into a rotating motion of the arm member 135b, and outputs the motion from the output shaft 135a.

The displacement portion 136 is a displaceable part in the hydraulic actuator 131, and includes a boss 136a, an arm 136b, and a shaft hole 136c. The boss 136a is a substantially cylindrical part having a boss hole, and is coaxially fixed on the output shaft 135a of the transmission portion 135 disposed in the front-back direction. The arm 136b is a part protruded from the boss 136a in a direction orthogonal to the axial direction of the boss 136a. The shaft hole 136c is a shaft hole provided in a distal end portion of the arm 136b.

The axial direction of the shaft hole 136c is parallel to the axial direction of the output shaft 135a.

The shaft hole 136c of the displacement portion 136 is a part that is rotatable about the axis of the output shaft 135a disposed substantially horizontally in the front-back direction. With the rotation of the output shaft 135a, the shaft hole 136c is displaced substantially in the up-down direction, drawing an arc-shaped locus. Consequently, the first principal brake rod 129a engaged with the shaft hole 136c is displaced substantially in the up-down direction with the movement of the displacement portion 136.

In the parking brake apparatus 102, the first principal brake rod 129a is indirectly connected to the piston 131b via the transmission portion 135.

Figure 12:
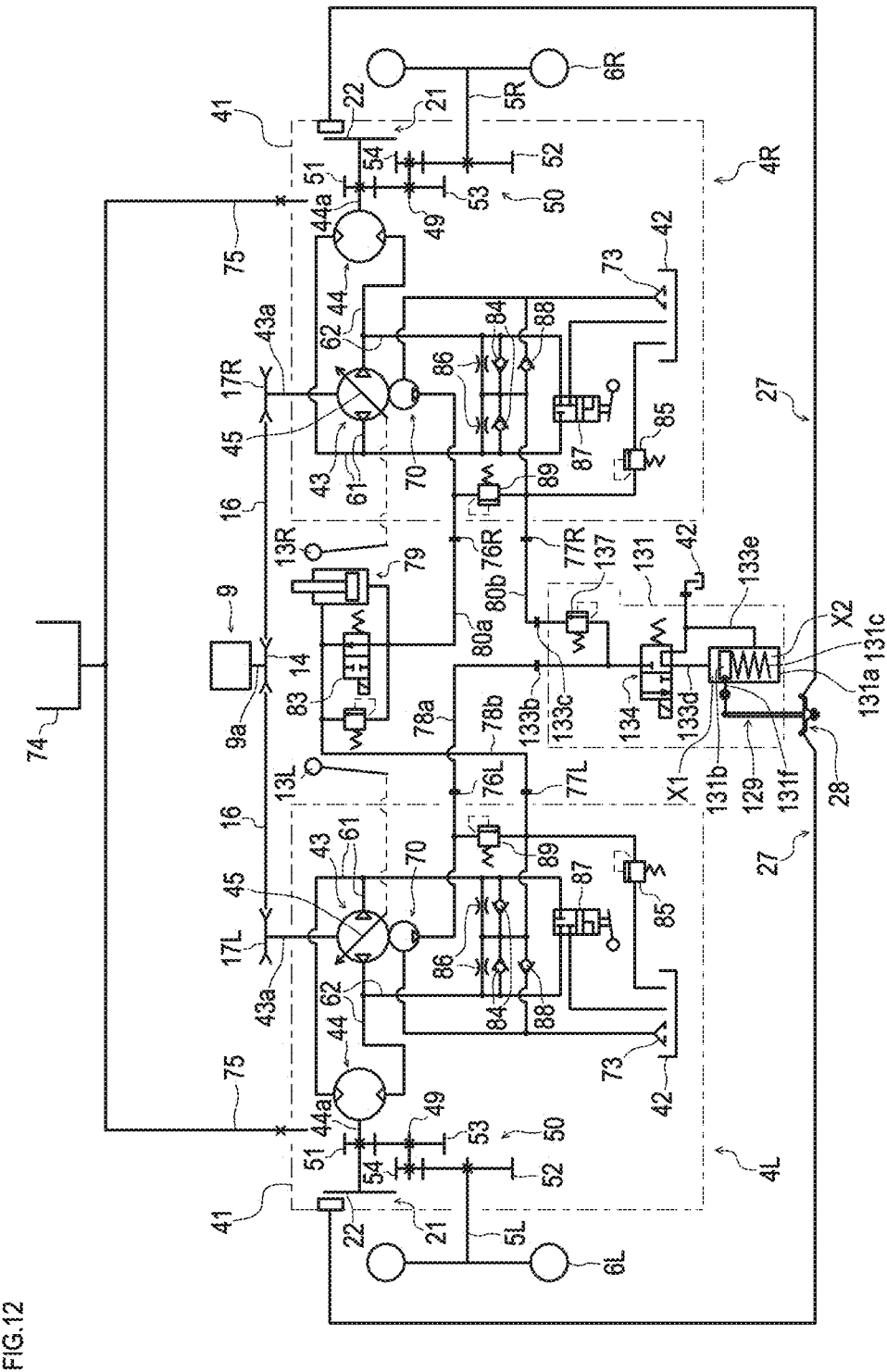
FIG. 12 is a hydraulic circuit diagram of the work vehicle with the parking brake apparatus according to embodiments.

Here, the configuration of a hydraulic circuit of the transaxles 4L and 4R in the parking brake apparatus 102 will be described. As shown in FIG. 12, ports 76 and 77 are provided in a housing 41 of the left transaxle 4L, and these are connected to a lifting device 79 of a mower 7 via oil passages 78a and 78b such as external piping, respectively. Ports 76 and 77 of the right transaxle 4R are connected to the solenoid valve 134 for operating the hydraulic actuator 131 via oil passages 80a and 80b. The ports 76 are connected to the discharge side of charge pumps 70 to be able to supply the hydraulic oil from the ports 76 to external hydraulic equipment such as the lifting device 79 and the solenoid valve 134 via the oil passage 78a and the oil passage 80a. On the other hand, the hydraulic oil is discharged to the ports 77 from the external hydraulic equipment such as the lifting device 79 and the solenoid valve 134 via the oil passage 78b and the oil passage 80b. The pressure of the hydraulic oil supplied from the ports 77 to charge check valves 84 is adjusted by charge pressure adjustment valves 85. An actuator relief valve 137 is disposed between the oil passage 78a and the oil passage 80b, to adjust the pressure of the hydraulic oil supplied to the hydraulic actuator 131.

As described above, the pair of left and right hydraulic type transaxles 4L and 4R provided in the work vehicle 1 includes the pair of left and right housings 41 in which the hydraulic oil is stored, and the pair of left and right independent hydraulic continuously variable transmissions 40 disposed in the housing 41. The left and right housings 41 have the ports 76L and 76R for discharging the hydraulic oil from the housings 41 and the ports 77L and 77R for supplying the hydraulic oil to the housings 41. The hydraulic oil is supplied to the hydraulic actuator 30 from one oil passage 78a and 80b of a pair of oil passage 78a and 80b and oil passage 78b and 80a that connect the port 76 of the housing 41 on one side and the port 77 of the housing 41 on the other side to each other. Since this configuration uses oil passages that are once taken out of the housings 41 to cool the hydraulic oil circulating in the left and right continuously variable transmissions 40 to improve transmission efficiency, as a hydraulic oil pressure source of the parking brake apparatus 2, the structure can be simplified.

Since the parking brake apparatus 2 uses part of the hydraulic oil used in the transaxles 4L and 4R to release the wet brake mechanisms 21 during engine operation, when the engine is stopped and the hydraulic pressure disappears, the parking brakes can be automatically applied, thus resulting in good operability of the parking brakes.

Next, the operation of the parking brake apparatus 102 will be described.

In the parking brake apparatus 102, when the driver performs an operation of depressing the parking brake pedal 20 (that is, artificially provides a parking instruction) with the wet brake mechanisms 21 not working, the hydraulic actuator 131 is operated, and the piston 131b is displaced to the highest position (brake operating position). At this time, the piston 131b is displaced by the hydraulic pressure of the hydraulic oil and the urging force of the spring member 131c.

Figure 13:
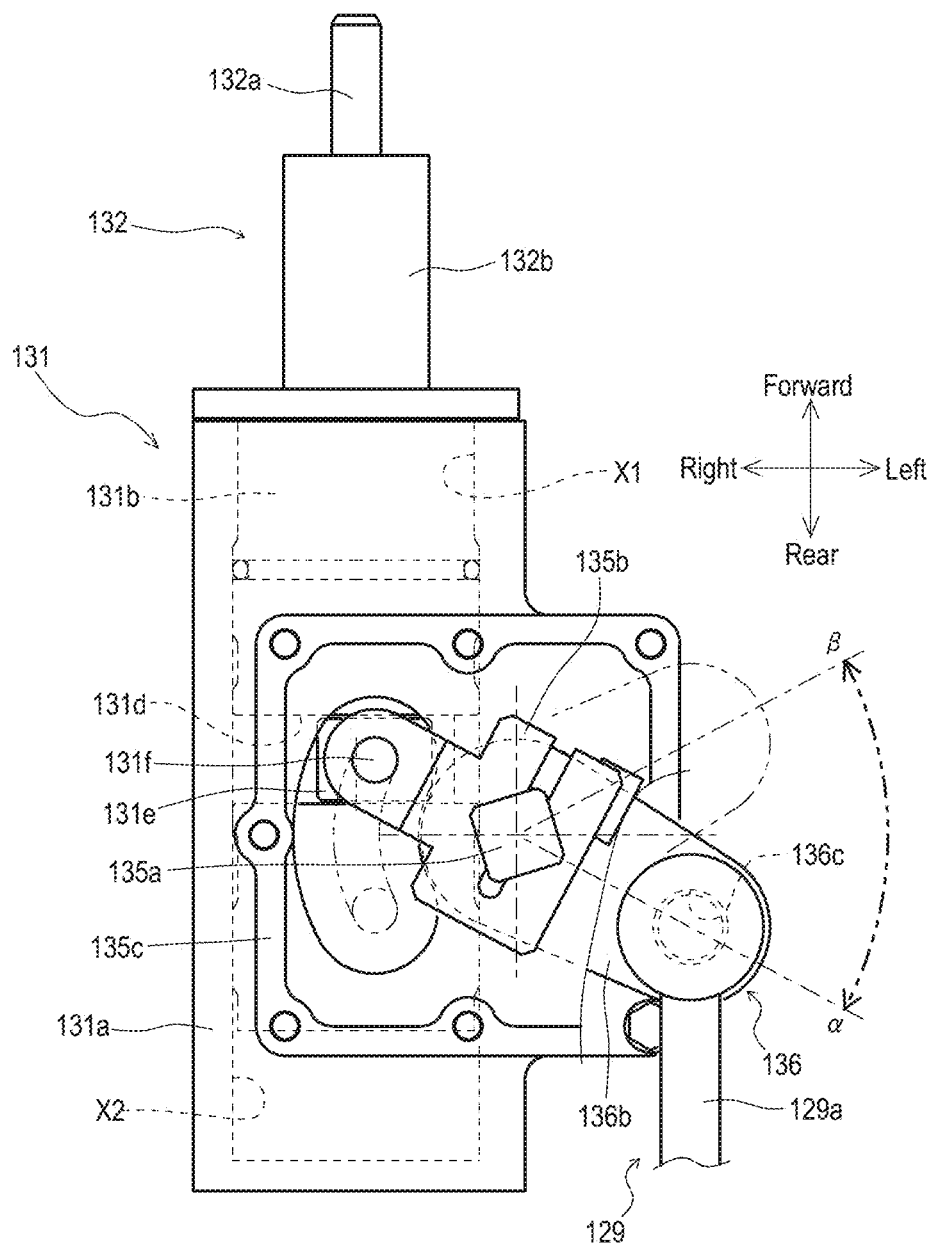
FIG. 13 is a front view of a hydraulic actuator constituting the parking brake apparatus according to embodiments.
Figure 14:
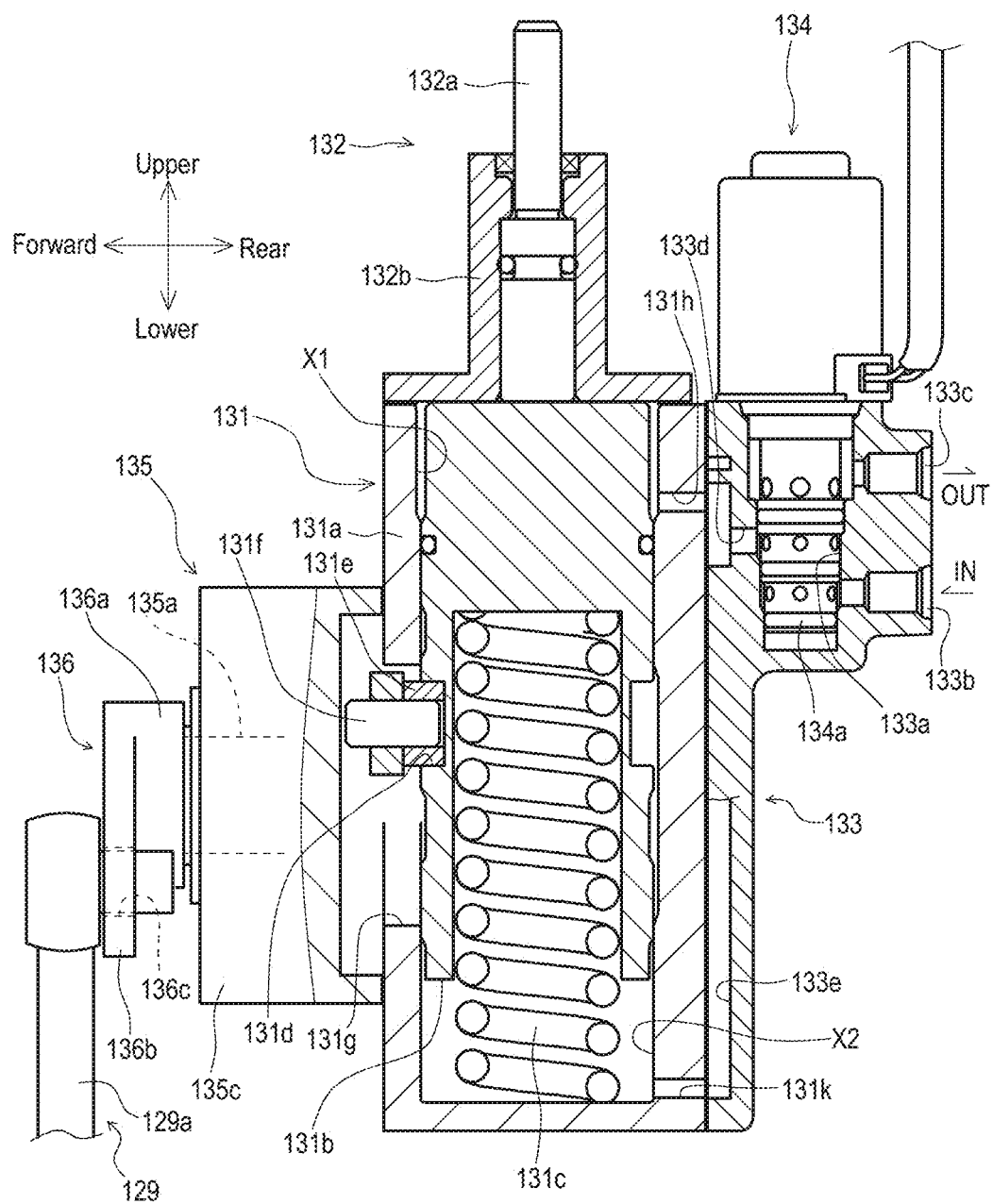
FIG. 14 is a cross-sectional side view of the hydraulic actuator constituting the parking brake apparatus according to embodiments.

When the piston 131b is displaced, the displacement portion 136 is displaced via the pin 131f, and the displacement portion 136 rotates about the output shaft 135a in a brake-working direction (the direction of an arrow α in FIG. 13). When the displacement portion 136 rotates, the shaft hole 136c of the displacement portion 136 is displaced, and the first principal brake rod 129a connected to the shaft hole 136c relatively rotatably is displaced.

The shaft hole 136c is displaced, drawing an arc-shaped locus as viewed in the axial direction of the output shaft 135a. In accordance with the amount of displacement in the downward direction in that displacement, the first principal brake rod 129a is displaced in the downward direction. When the first principal brake rod 129a is displaced in the downward direction, the bell crank 129c is rotated, and the second principal brake rod 129b and the equalizer 28 are displaced in the forward direction accordingly. When the second principal brake rod 129b and the equalizer 28 are displaced in the forward direction, the pair of auxiliary brake rods 27 and 27 connected to the equalizer 28 are displaced in the forward direction by the same amount of displacement. When the auxiliary brake rods 27 and 27 are displaced in the forward direction, the brake arms 26 and 26 of the transaxles 4L and 4R are rotated to brake operating positions, whereby the wet brake mechanisms 21 of the parking brake apparatus 102 work.

In the parking brake apparatus 102, when the driver performs an operation of depressing the parking brake pedal 20 with the wet brake mechanisms 21 working (that is, artificially releases the parking instruction), the hydraulic actuator 131 is operated, and the piston 131b is displaced to the lowest position (brake non-operating position) by the hydraulic pressure of the hydraulic oil against the urging force of the spring member 131c.

When the piston 131b is displaced, the displacement portion 136 is displaced via the pin 131f, and the displacement portion 136 rotates about the output shaft 135a in a brake-releasing direction (the direction of an arrow β in FIG. 13). When the displacement portion 136 rotates, the shaft hole 136c of the displacement portion 136 is displaced, and the first principal brake rod 129a connected to the shaft hole 136c relatively rotatably is displaced.

The shaft hole 136c is displaced, drawing an arc-shaped locus as viewed in the axial direction of the output shaft 135a. In accordance with the amount of displacement in the upward direction in that displacement, the first principal brake rod 129a is displaced in the upward direction. When the first principal brake rod 129a is displaced in the upward direction, the bell crank 129c is rotated, and the second principal brake rod 129b and the equalizer 28 are displaced in the backward direction accordingly. When the second principal brake rod 129b and the equalizer 28 are displaced in the backward direction, the pair of auxiliary brake rods 27 and 27 connected to the equalizer 28 are displaced in the backward direction by the same amount of displacement. When the auxiliary brake rods 27 and 27 are displaced in the backward direction, the brake arms 26 and 26 of the transaxles 4L and 4R are rotated to brake non-operating positions, whereby the wet brake mechanisms 21 are released from braking.

Specifically, the work vehicle 101 has the driver's seat 12 on which the driver is seated, the hydraulic actuator 131 is disposed below the driver's seat 12 with the displacement direction of the piston 131*b* oriented in the up-down direction of the body of the work vehicle 101, and the principal brake rod 129 has the first principal brake rod 129*a* oriented in the up-down direction of the body of the work vehicle 101 and connected to the piston 131*b*, the second principal brake rod 129*b* oriented in the front-back direction of the body of the work vehicle 101 and connected to the balance arm 281, and the bell crank 129*c* that connects the first principal brake rod 129*a* and the second principal brake rod 129*b* and converts the displacement in the up-down direction of the first principal brake rod 129*a* into displacement in the front-back direction to transmit the converted displacement to the second principal brake rod 129*b*.

In the work vehicle 101 of this configuration, the parking brake apparatus 102 allows the hydraulic actuator 131 to be provided at a height different from that of the equalizer 28, which can increase the degree of freedom in the disposition of the hydraulic actuator 131. For example, the hydraulic actuator 131 can be disposed in an easy-to-access position directly below the seat to improve maintainability. By disposing the hydraulic actuator 131 higher, the hydraulic actuator 131 is less prone to being covered with mud, dust, etc., and the parking brake apparatus 102 is improved in durability.

It is understood by those skilled in the art that the above descriptions are recommended examples of the disclosed apparatus, and that various modifications are possible in as long as they do not depart from the spirit and scope defined in the claims.

What is claimed is:

1. A parking brake apparatus for a vehicle, comprising:
   brake units for right and left hydraulic transaxles, wherein each of the brake units comprise a brake arm;
   a single hydraulic actuator comprising a cylinder and a piston housed in the cylinder in such a manner as to be reciprocably displaceable along the cylinder;
   a valve for switching supply of hydraulic oil from the hydraulic transaxles to the single hydraulic actuator, wherein the hydraulic actuator is configured to displace the piston to one of a brake operating position and a brake non-operating position in response to the switching of the hydraulic supply by the valve;
   a balance arm connected to the piston in such a manner as to be at least partially free to rotate with respect to a vertical axis of the vehicle; and
   left and right brake rods connected between left and right end portions of the balance arm and the left and right brake arms, respectively,
   wherein the piston is connected to the balance arm at a point disposed between the connections of the left and right brake arms to the balance arm,
   wherein the hydraulic actuator further includes a spring member for constantly urging the piston to the brake operating position, and
   wherein the parking brake apparatus is configured to simultaneously apply or release braking pressure from the brake units.

2. The parking brake apparatus for a vehicle according to claim 1, further comprising:
   a rod connected at a first end to the piston and connected at a second end to the balance arm.

3. The parking brake apparatus for a vehicle according to claim 2, wherein each of the left and right hydraulic transaxles include:
   left and right housings, respectively, in which the hydraulic oil is stored; and
   left and right independent hydraulic continuously variable transmissions disposed in the housings, respectively,
   wherein the left and right housings each include a discharge port for discharging the hydraulic oil from the housings, a supply port for supplying the hydraulic oil to the housings, and an oil passage that connects the discharge port of one of the housings to the supply port of the other housing, and
   wherein the hydraulic oil is supplied to the single hydraulic actuator from one of the oil passages.

4. The parking brake apparatus for a vehicle according to claim 2,
   wherein the vehicle includes a seat on which a driver is seated,
   the hydraulic actuator is disposed below the seat with a displacement direction of the piston oriented in an front-back direction of a body of the vehicle.

5. The parking brake apparatus for a vehicle according to claim 1, further comprising:
   a first rod connected to the piston;
   a second rod connected to the balance arm, being oriented in a front-back direction of the body of the vehicle; and
   a bell crank connecting the first rod and the second rod.

6. The parking brake apparatus for a vehicle according to claim 5, wherein each of the left and right hydraulic transaxles include:
   left and right housings, respectively, in which the hydraulic oil is stored; and
   left and right independent hydraulic continuously variable transmissions disposed in the housings, respectively,
   wherein the left and right housings each include a discharge port for discharging the hydraulic oil from the housings, a supply port for supplying the hydraulic oil to the housings, and an oil passage that connects the discharge port of one of the housings to the supply port of the other housing, and
   wherein the hydraulic oil is supplied to the single hydraulic actuator from one of the oil passages.

7. The parking brake apparatus for a vehicle according to claim 5,
   wherein the vehicle includes a seat on which a driver is seated,
   wherein the hydraulic actuator is disposed below the seat with a displacement direction of the piston oriented in an up-down direction of a body of the vehicle, and
   wherein the bell crank is configured to convert displacement of the first rod in the up-down direction into displacement in the front-back direction and transmitting the displacement to the second rod.

8. The parking brake apparatus for a vehicle according to claim 1,
   wherein the valve is a solenoid valve which is operated by receiving an electrical signal generated by an operation of an operator, and
   wherein the valve is integrally formed with a body of the hydraulic actuator.

9. A parking brake apparatus for a vehicle, comprising:
   brake units for right and left hydraulic transaxles, wherein each of the brake units comprise a brake arm;
   a single hydraulic actuator comprising a cylinder and a piston housed in the cylinder in such a manner as to be reciprocably displaceable along the cylinder;
   a valve for switching supply of hydraulic oil from the hydraulic transaxles to the single hydraulic actuator, wherein the hydraulic actuator is configured to displace the piston to one of a brake operating position and a brake non-operating position in response to the switching of the hydraulic supply by the valve;

a balance arm connected to the piston in such a manner as to be at least partially free to rotate with respect to a vertical axis of the vehicle;

a rod connected at a first end to the piston and connected at a second end to the balance arm; and left and right brake rods connected between left and right end portions of the balance arm and the left and right brake arms, respectively, wherein the hydraulic actuator further includes a spring member for constantly urging the piston to the brake operating position, wherein the parking brake apparatus is configured to simultaneously apply or release braking pressure from the brake units wherein each of the left and right hydraulic transaxles include:
 left and right housings, respectively, in which the hydraulic oil is stored; and
 left and right independent hydraulic continuously variable transmissions disposed in the housings, respectively,
 wherein the left and right housings each include a discharge port for discharging the hydraulic oil from the housings, a supply port for supplying the hydraulic oil to the housings, and an oil passage that connects the discharge port of one of the housings to the supply port of the other housing, and
 wherein the hydraulic oil is supplied to the single hydraulic actuator from one of the oil passages.

10. A parking brake apparatus for a vehicle, comprising:

brake units for right and left hydraulic transaxles, wherein each of the brake units comprise a brake arm;

a single hydraulic actuator comprising a cylinder and a piston housed in the cylinder in such a manner as to be reciprocably displaceable along the cylinder;

a valve for switching supply of hydraulic oil from the hydraulic transaxles to the single hydraulic actuator, wherein the hydraulic actuator is configured to displace the piston to one of a brake operating position and a brake non-operating position in response to the switching of the hydraulic supply by the valve;

a balance arm connected to the piston in such a manner as to be at least partially free to rotate with respect to a vertical axis of the vehicle;

a pair of left and right brake rods connected between left and right end portions of the balance arm and the left and right brake arms, respectively;

a first rod connected to the piston;

a second rod connected to the balance arm, being oriented in a front-back direction of the body of the vehicle; and a bell crank connecting the first rod and the second rod, wherein the hydraulic actuator further includes a spring member for constantly urging the piston to the brake operating position, and wherein the parking brake apparatus is configured to simultaneously apply or release braking pressure from the brake units.

11. The parking brake apparatus for a vehicle according to claim 10, wherein the vehicle includes a seat on which a driver is seated, wherein the hydraulic actuator is disposed below the seat with a displacement direction of the piston oriented in an up-down direction of a body of the vehicle, and wherein the bell crank is configured to convert displacement of the first rod in the up-down direction into displacement in the front-back direction and transmitting the displacement to the second rod.

* * * * *

UNITED STATES PATENT AND TRADEMARK OFFICE
CERTIFICATE OF CORRECTION

Page 1 of 1

PATENT NO. : 10,888,047 B2
APPLICATION NO. : 16/260831
DATED : January 12, 2021
INVENTOR(S) : Yasuda et al.

It is certified that error appears in the above-identified patent and that said Letters Patent is hereby corrected as shown below:

In the Claims

In Column 16, Claim 4, Line 17, change "an" to -- a --.

In Column 17, Claim 9, Line 15, change "units" to -- units, and --.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*